(12) United States Patent
George et al.

(10) Patent No.: US 10,617,945 B1
(45) Date of Patent: Apr. 14, 2020

(54) GAME VIDEO ANALYSIS AND INFORMATION SYSTEM

(71) Applicant: Amazon Technologies, Inc., Seattle, WA (US)

(72) Inventors: Michael Martin George, Mercer Island, WA (US); Scott Edward Van Vliet, Las Flores, WA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 14/968,751

(22) Filed: Dec. 14, 2015

(51) Int. Cl.
| *A63F 9/24* | (2006.01) |
| *A63F 13/31* | (2014.01) |
| *A63F 13/23* | (2014.01) |
| *G06F 3/0481* | (2013.01) |
| *A63F 13/73* | (2014.01) |
| *A63F 13/497* | (2014.01) |

(52) U.S. Cl.
CPC .............. *A63F 13/31* (2014.09); *A63F 13/23* (2014.09); *A63F 13/497* (2014.09); *A63F 13/73* (2014.09); *G06F 3/04815* (2013.01)

(58) Field of Classification Search
CPC ........ A63F 13/497; A63F 13/53; A63F 13/86; A63F 2300/577; A63F 2300/634; H04N 21/4316; H04N 21/4722; H04N 21/4725
See application file for complete search history.

(56) References Cited

U.S. PATENT DOCUMENTS

| 8,407,084 B2 | 3/2013 | Chugh |
| 8,665,374 B2 | 3/2014 | Katz et al. |
| 8,752,087 B2 | 6/2014 | Begeja et al. |
| 9,005,036 B2 * | 4/2015 | Laakkonen ......... G07F 17/3272 463/30 |
| 9,111,287 B2 | 8/2015 | Liu et al. |
| 9,986,001 B2 * | 5/2018 | Takaichi ............ H04N 21/4781 |

(Continued)

OTHER PUBLICATIONS

Babaguchi, Noboru, and Naoko Nitta. "Intermodal collaboration: A strategy for semantic content analysis for broadcasted sports video." Image Processing, 2003. ICIP 2003. Proceedings. 2003 International Conference on. vol. 1. IEEE, 2003, pp. 1-4.

(Continued)

*Primary Examiner* — Dmitry Suhol
*Assistant Examiner* — Carl V Larsen
(74) *Attorney, Agent, or Firm* — Robert C. Kowert; Kowert, Hood, Munyon, Rankin & Goetzel, P.C.

(57) ABSTRACT

A game information system that locates and identifies content in live or prerecorded video of games or other events, and that obtains information about the located content from one or more sources. Players associated with the located and identified content may be identified, and information about the players may also be obtained. The information about the identified content and/or players may be provided to devices associated with participants for display. The information may be overlaid on the game video and/or displayed in separate windows or screens. A participant may interact with the displayed information to obtain additional information about the content and/or players. Video and/or audio analysis techniques may be used to locate the content in the video. A machine learning technique may be used to improve performance of content location and identification over time.

26 Claims, 20 Drawing Sheets

(56) References Cited

U.S. PATENT DOCUMENTS

| | | | |
|---|---|---|---|
| 2009/0063659 A1* | 3/2009 | Kazerouni | G06F 3/14 709/219 |
| 2009/0077503 A1* | 3/2009 | Sundstrom | G06F 3/04842 715/856 |
| 2009/0259941 A1 | 10/2009 | Kennedy, Jr. | |
| 2010/0153831 A1 | 6/2010 | Beaton | |
| 2010/0299202 A1 | 11/2010 | Li et al. | |
| 2011/0113444 A1 | 5/2011 | Popovich | |
| 2012/0093481 A1* | 4/2012 | McDowell | G11B 27/105 386/241 |
| 2012/0100910 A1* | 4/2012 | Eichorn | H04N 21/43615 463/31 |
| 2012/0100915 A1 | 4/2012 | Margalit et al. | |
| 2012/0190455 A1 | 7/2012 | Briggs | |
| 2012/0230538 A1 | 9/2012 | Calman et al. | |
| 2014/0228112 A1* | 8/2014 | Laakkonen | A63F 13/10 463/31 |
| 2014/0250457 A1 | 9/2014 | Ramaswamy | |
| 2014/0274387 A1* | 9/2014 | Lewis | A63F 13/00 463/31 |
| 2014/0323213 A1* | 10/2014 | Wakeford | A63F 13/60 463/31 |
| 2015/0106856 A1* | 4/2015 | Rankine | H04N 21/8583 725/60 |
| 2015/0135212 A1* | 5/2015 | Smolic | H04N 21/4122 725/32 |
| 2015/0296250 A1* | 10/2015 | Casper | H04N 21/4316 725/34 |
| 2015/0304698 A1 | 10/2015 | Redol | |
| 2017/0011554 A1* | 1/2017 | Burba | A63F 13/5255 |
| 2017/0072324 A1* | 3/2017 | Navok | A63F 13/355 |
| 2017/0209786 A1* | 7/2017 | Zhu | A63F 13/355 |
| 2018/0139257 A1* | 5/2018 | Ninoles | H04L 65/4076 |

OTHER PUBLICATIONS

U.S. Appl. No. 14/755,967, filed Jun. 30, 2015, Gilmore, et al.
U.S. Appl. No. 14/318,013, filed Jun. 27, 2014, Heinz, et al.
U.S. Appl. No. 14/317,984, filed Jun. 27, 2014, Heinz, et al.
U.S. Appl. No. 14/500,619, filed Sep. 29, 2014, Cabanero, et al.
U.S. Appl. No. 14/500,593, filed Sep. 29, 2014, Cabanero, et al.
U.S. Appl. No. 14/500,600, filed Sep. 29, 2014, Cabanero, et al.

* cited by examiner

GAME VIDEO ANALYSIS AND INFORMATION SYSTEM

BACKGROUND

Evolution of the Internet, Web-based computing, and mobile computing, including the increasingly widespread availability of broadband connections, support for high-resolution video, and the availability and capabilities of consumer computing devices including but not limited to mobile computing devices such as pad/tablet devices and smartphones, has led to continuing evolution and growth of online gaming. Online games may include everything from relatively simple, two-dimensional (2D) casual games to more complex 2D or three-dimensional (3D) action, sports, or strategy games that may involve one or more players in a game session, to multiplayer online battle arena (MOBA) games, to world-building multiplayer games, to complex 3D massively multiplayer online games (MMOGs) such as massively multiplayer online role-playing games (MMORPGs) that may support hundreds or thousands of active players in a persistent online "world".

The continued evolution and growth of online gaming has in turn led to the rise in popularity of video game spectating, or virtual spectating. In virtual spectating, one or more viewers or spectators may watch the game play of one or more other players actively participating in an online game without themselves actively participating in the game play. For example, in a multiplayer online game, spectators may watch one or more players or teams of players involved in a battle or otherwise participating in game play. Broadband Internet, high-resolution video, and video streaming technologies have led to the development of live broadcasting technologies that may be leveraged to provide online virtual spectating for online games. For example, a game spectating system may allow players to broadcast live or recorded streams of their game play to tens, hundreds, or thousands of spectators, while allowing the spectators to select the live or recorded broadcasts of particular players for viewing.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for providing game information to participants in game environments are described. The game environments may include, but are not limited to, console games, online games, and game spectating systems. The participants may include game players and game spectators. Embodiments of methods and systems that may be used in game environments to determine game content and provide game information for the determined game content. In particular, embodiments of a game information system, module, or service are described that may, for example, be used with game systems in game environments to analyze game video and/or game metadata to locate and identify game content in live or previously recorded game video, to determine information about or related to the game or game content, to identify and obtain information about or related to players associated with the game or game content, and to provide the information about or related to the game, game content and/or players to participants (e.g., game players and/or spectators) via respective participant devices.

Figure 3:
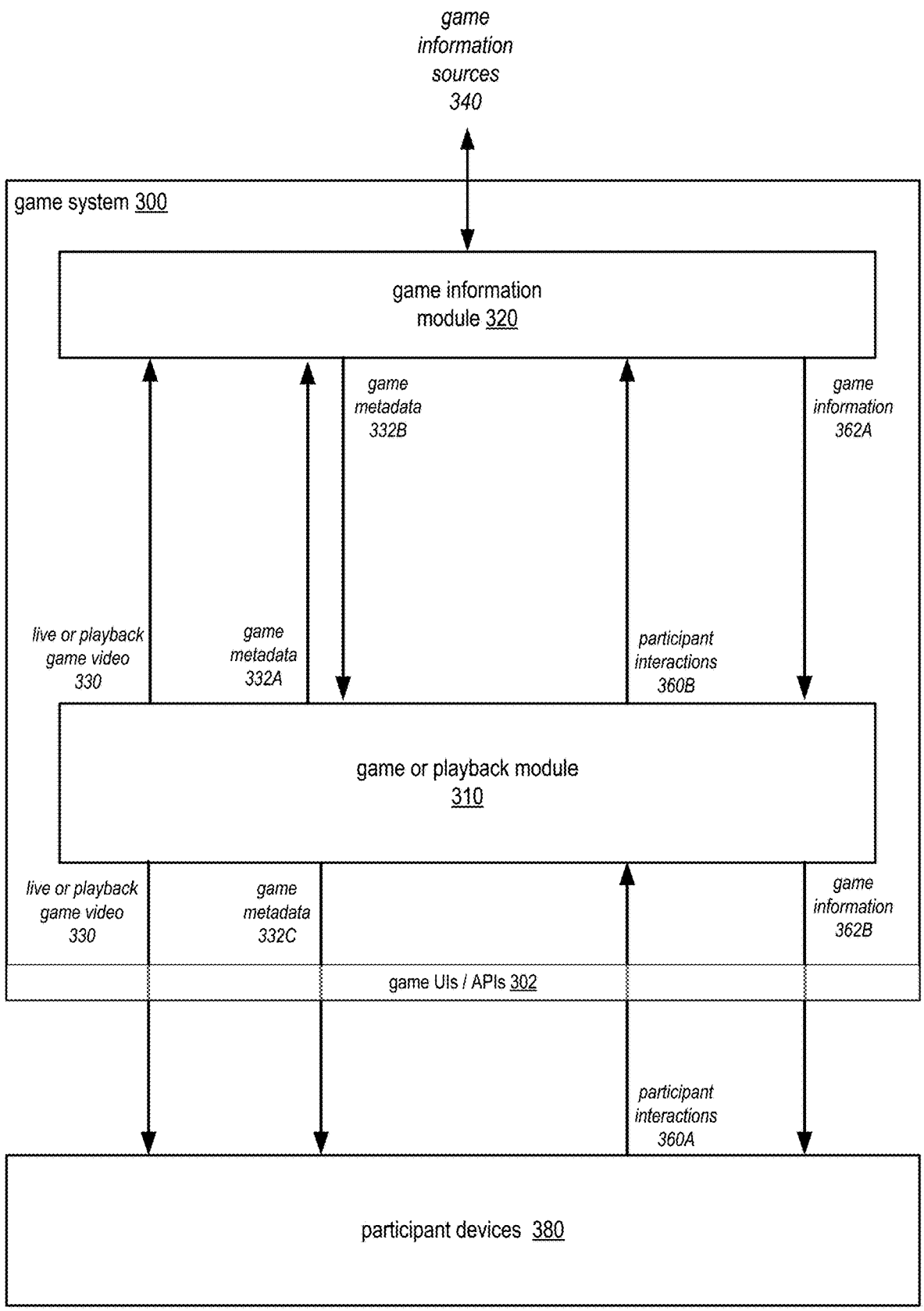
FIG. 3 is a block diagram that illustrates a game environment in which a game information module is implemented in or by a game system, according to some embodiments.
Figure 4:
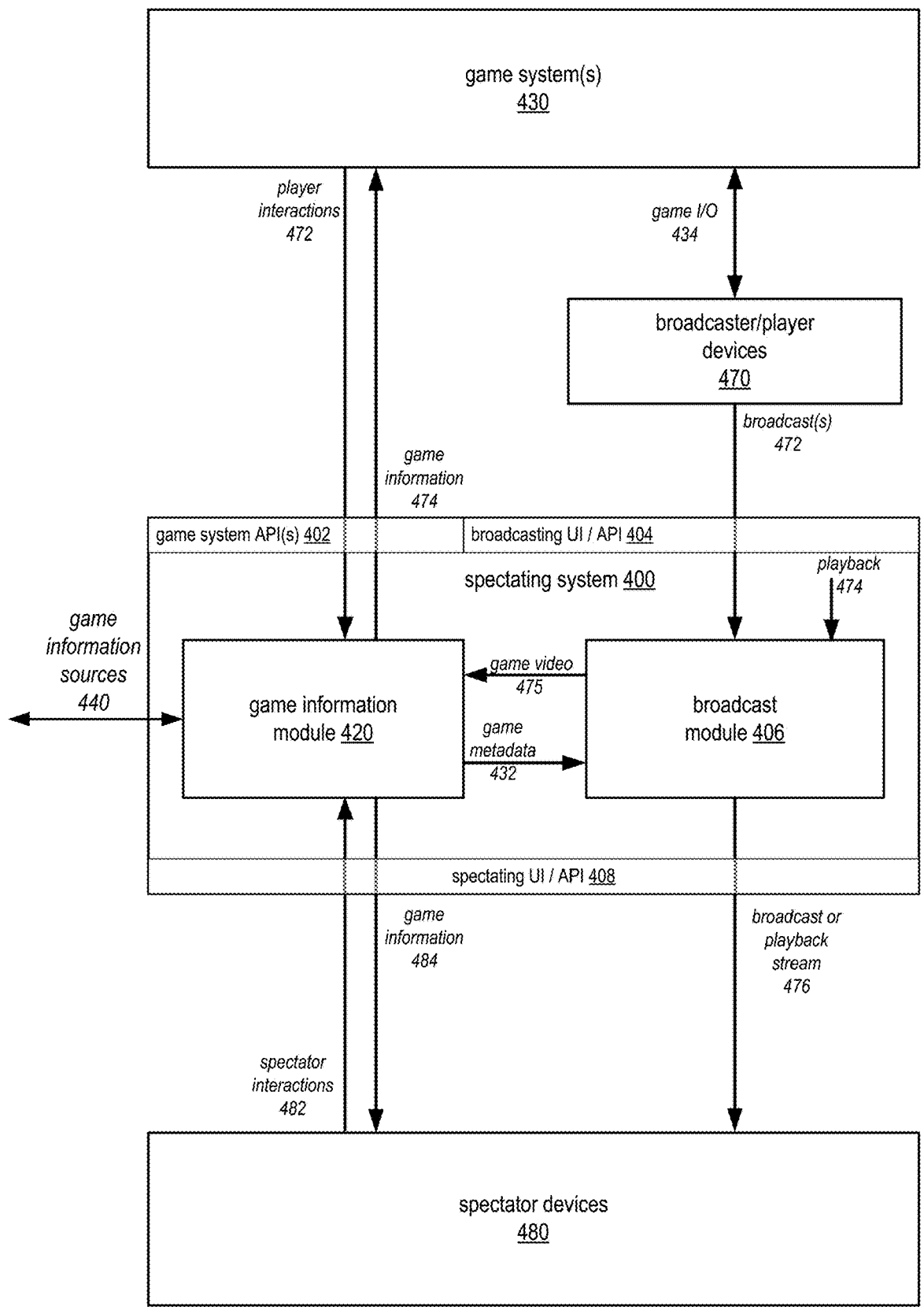
FIG. 4 is a block diagram that illustrates a game environment in which a game information module is implemented in or by a spectating system, according to some embodiments.
Figure 14:
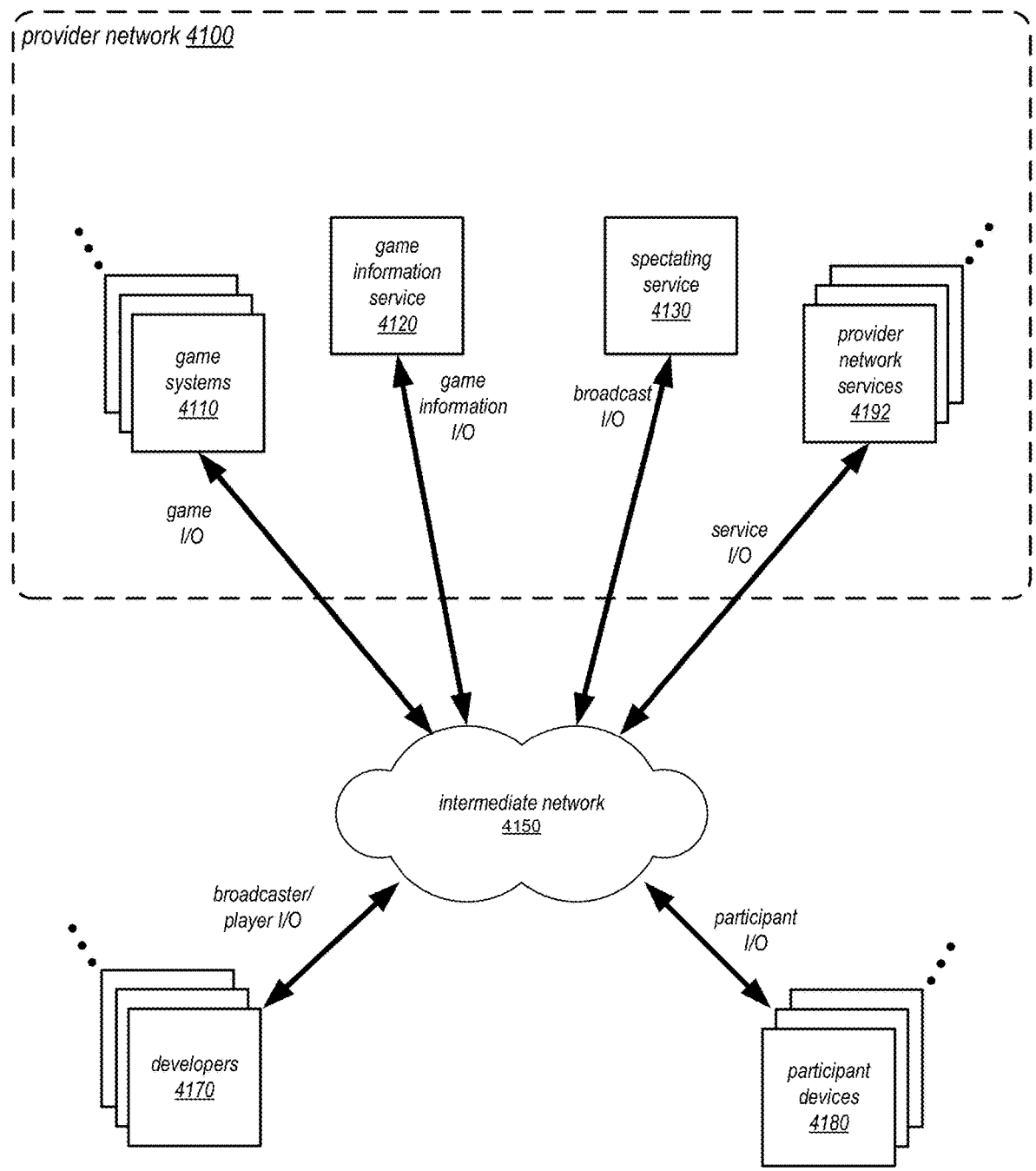
FIG. 14 illustrates an example network-based game and/or spectating environment that includes a game information service, according to some embodiments.

Game environments may include, but are not limited to, console games, online games, and game spectating systems. For simplicity, game implementations in general may be referred to as game systems. In a game system, players actively participate in game play as executed by a game engine, while spectators watch the game play of the players, possibly but not necessarily from remote locations. A game spectating system includes one or more game systems and a spectating service that broadcasts game play to spectators, with at least some players in the games executed by the game systems also acting as broadcasters. In some embodiments, a game information module may be implemented as a component of or plug-in for a game system in a game environment, for example as illustrated in FIG. 3. In some embodiments, a game information module may be implemented by a spectating service in a game spectating environment, for example as illustrated in FIG. 4. In some embodiments, a game information module may be implemented as or by an application or service external to the game system(s) and spectating service, for example as illustrated in FIG. 14.

Online games are network-based games that may allow one, two, or more players, in some cases even thousands of players, to simultaneously participate in a game from consumer devices coupled to a network. At least some online games may provide a "spectator" or "observer" mode that allows spectators to watch game play from consumer devices coupled to the network without directly participating in the game. At least some online games may also allow game sessions to be recorded and played back for viewing by the players and/or spectators.

Games that may be implemented in gaming environments as described herein may vary from tightly scripted games to games that introduce varying amounts of randomness to the game play. A game may, for example, be a game in which the players attempt to achieve some goal or overcome some obstacle, and may include multiple levels that the players have to overcome. A game may, for example, be a game in which the players cooperate to achieve goals or overcome obstacles, or a game in which one or more of the players compete against one or more other players, either as teams or as individuals. Alternatively, a game may be a game in which the players may more passively explore and make discoveries within a complex game universe without any particular goals in mind, or a "world-building" game in which the players may actively modify their environments within the game universe. Games may include everything from relatively simple, two-dimensional (2D) casual games to more complex 2D or three-dimensional (3D) action, sports, or strategy games, to multiplayer online battle arena (MOBA) games, to complex 3D massively multiplayer online games (MMOGs) such as massively multiplayer online role-playing games (MMORPGs) that may simultaneously support hundreds or thousands of players in a persistent online "world".

Game spectating systems may include network-based video streaming systems or services that may allow players to broadcast live streams of their online game play to tens, hundreds, thousands or more spectators, while allowing the spectators to select the broadcasts of particular players (also referred to as channels) for viewing. A game spectating system may support live streaming of broadcasts from tens, hundreds, or thousands of players simultaneously. A game spectating system may record at least some live broadcasts and allow the recorded broadcasts to be played back for viewing by spectators. A game spectating system may support live and recorded broadcasts for one, two, or more different online games.

In this document, the term "player" is generally used to refer to an actual human that actively participates in a game, the term "spectator" is generally used to refer to an actual human that watches live or recorded game play without directly participating in the game as a player, the term "participant" is generally used to collectively refer to players (active participants) and spectators (passive participants), the term "client" (as in "client device", "game client", "broadcasting client", and "spectating client") is generally used to refer to a hardware and/or software interface to a game system or streaming system via which a participant interacts with the game system and/or spectating system, and the term "character" or "game character" is generally used to refer to a player's in-game presence or "avatar" that the player may control via a game client on a client device to interact with other game characters, other game entities, and other objects within the game environment during a game session.

In some embodiments, a game system may implement an online multiplayer game, and the game system may be or may include one or more devices on a network of a game provider that implement s game engine and UI/API and that serve as or provide an execution environment for the online multiplayer game. In these online multiplayer game environments, participant (player and spectator) devices are typically remotely located from the game system and access the game system via wired and/or wireless connections over an intermediate network or networks such as the Internet. Further, the participant devices may typically have both input and output capabilities for playing and/or spectating the online multiplayer game.

In some embodiments, instead of a game system implemented according to a client-server model or variation thereof in which one or more devices such as servers host most or all of the functionality of the online game, a game system may at least in part be implemented as or on local devices that implement at least a portion of the game logic, for example gaming consoles that serve as local execution environments for console-based online multiplayer games installed on the console or executed from media inserted into the console. One or more participant devices may be local to the game system, and may access the game system via local wired or wireless connections for game play or spectating. In some embodiments, instead of a game system implemented according to a client-server model or variation thereof in which one or more devices such as servers host most or all of the functionality of the game system, a game system may be implemented according to a distributed or peer-to-peer architecture in which at least some of the game functionality and components of the game system are distributed among one, two, or more participant devices that collectively participate in a peer-to-peer relationship to execute, play in, and/or spectate game sessions.

The following is a broad description of an example method for game execution in a game environment, and is not intended to be limiting. In some embodiments, for a particular game session, a game engine of a game system may generate a game universe that includes the game session's context, characters, and environment. The players manipulate their characters within this universe via player devices and/or controllers. The game system may generate and display a view of the game universe from the perspective of each player's character to the player on the player's respective device, and may receive player input to and interactions with the game universe via the player's respective device and/or controller. The game system may also generate and display a view of the game universe from the current perspective or viewpoint of each spectator on the spectator's respective device. Note that the spectators typically do not have characters or avatars that appear within the game universe.

Typically, game logic/execution of the game system is implemented in a game engine according to event-driven architecture in which a game event loop monitors for and reacts to players' inputs to and interactions with the game universe via their respective devices and/or controllers. Based upon the players' inputs and interactions with the universe and on other game factors (e.g., scripted events and/or a randomness component) at iterations of the game event loop, the game session progresses along a game session timeline, with the game universe being modified and updated accordingly.

In some embodiments, concurrent with the game event loop execution, the game system renders a 2D or 3D representation of the game universe based on the current state of the universe, generates video and sound according to a video frame rate based upon the rendering, and sends or streams the video and sound output to participant devices for display. In some embodiments, the video and sound may be generated for and sent or streamed to each participant device according to a corresponding participant's current perspective or view of the universe.

While embodiments are primarily described herein in the context of determining game content of game video and providing game information for the determined game content in multiplayer online gaming environments in which two or more players participate in online game sessions, it is to be noted that embodiments may also be applied in single-player online games, as well as in single-player and multiplayer games that are not necessarily online, such as single-player and multiplayer console games that may be played locally/offline. In addition, in some embodiments, a spectating system may support broadcasts of live and/or recorded digital media content from sources other than game systems, for example from sports games, competitions, concerts, and other events including but not limited to live streams from electronic spectator sports (eSports) competitions, and embodiments may also be applied to determine content of video and provide game information for the determined content for these broadcasts.

The information that is provided to the participants for the determined game content may include any information about or related to the game or game content that is determined by the game information system. The information may be obtained by the game information system from one or more local sources (e.g., a local store or cache of game-related information) and/or external sources (e.g., the game systems themselves, the game participants, third-party game information sources, external stores of game-related information such as websites, etc.). The information that is provided for game content may include, but is not limited to, information identifying and describing at least one player associated with the respective game content; statistics (e.g., usage statistics) in the game or across two or more games for a respective character, object, item, or player; history or backstories for a respective character, object item, or player; comparisons of a respective character, object, item, or player; to other characters, objects, items, or player within or associated with the game; information on environmental content such as game boards, game levels, game maps, and so on; tutorials, hints, or other types of reference data for the game or game play; or in general any information that may be obtained or generated for the game, game content such as game characters, objects, or items, environmental content, or the players associated with the respective game or game content. In some embodiments, the information may be visually presented to the participants, for example as overlays on the game video and/or as or in user interface elements presented via a user interface. In some embodiments, audio information about the identified content may be provided instead of or in addition to the visually presented information.

Unlike movies, which are linear (i.e., viewers of a movie all see the same scenes and content presented in the same order), games are non-linear. Participants (players and/or spectators) may view a game being played from different angles or perspectives, the scenes that are presented and the action and content of those scenes may vary based on game play, different participants may explore different parts of the game universe, the same game scenario or game level may be played differently and may thus include different combinations or views of content in different game sessions, and so on. Further, a particular game session may be recorded from different perspectives or from different players' points of view, and spectators may replay the game session from those different perspectives or points of view. Thus, embodiments of the game information system may adapt the identification of content and the information provided for that content according to the non-linear nature of game play. Different participants may be presented with information about different content identified in the portion of the game universe as viewed from the participants' particular perspectives, different information may be presented according to the participants' particular views of the game universe, and the information about content that is presented (e.g., as overlays on the game video and/or as or in user interface elements presented via a user interface) may be adapted to the participants' particular views of the game universe. In some embodiments, information about the particular participants (e.g., player or spectator profile information including but not limited to demographic information, whether the participant is a player or spectator, etc.) may be used in identifying or filtering the information about content that is to be presented to the particular participants and the way that information is presented.

Embodiments of the methods and apparatus for providing game information to participants in game environments as described herein may enhance game play and the game experience for the participants (both spectators and players). For example, the information about game content that is provided by the game information system may be leveraged by participants to learn about games, to enhance their game play or game viewing, and to provide additional information about the game that may allow a player to improve their game play or to gain a competitive advantage during game play. In addition, broadcasters may leverage the game information system to obtain additional information about items, objects, characters, players, the game environment, game history, game strategies, and so on, and may use that additional information to enhance their broadcast content.

Figure 1A:
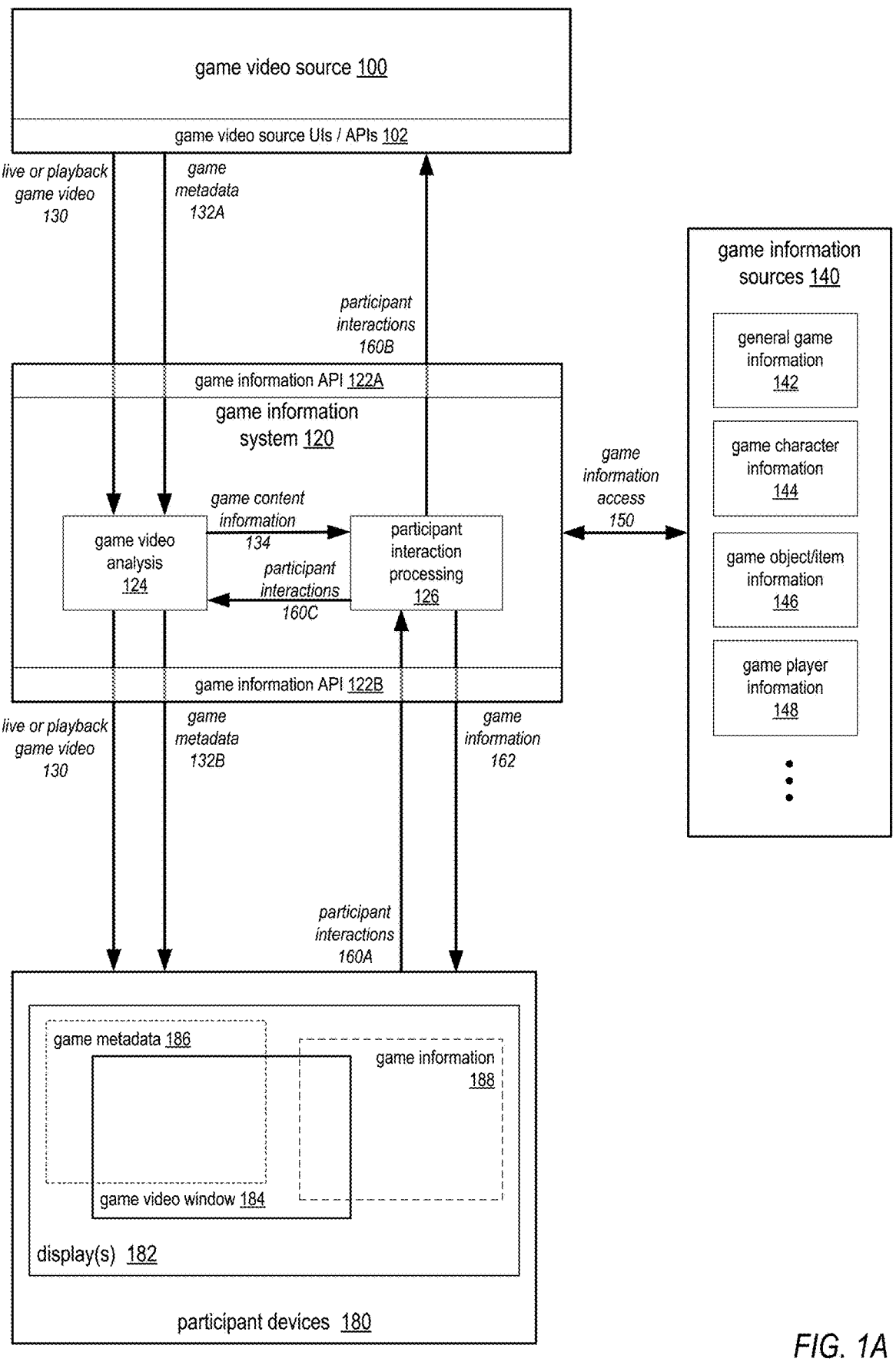
FIG. 1A is a block diagram that illustrates a game information system or service located between a game video source and participant devices in a game environment, according to some embodiments.

FIG. 1A is a block diagram that illustrates a game information system or service located between a game video source and participant devices in a game environment, according to some embodiments. In some embodiments, a game environment may include a game video source 100 and one or more participant devices 180. In some embodiment, the game video source 100 may store at least some game data and information. In some embodiments, the game video source 100 may be a game system that implements game logic and serves as an execution environment for the game, and that may provide live or playback of previously recorded video 130 of games to participant devices 180, for example as illustrated in FIG. 3. Alternatively, in some embodiments, the game video source 100 may be a spectating system that obtains live or previously recorded game video from one or more sources (e.g., game systems, broadcaster devices, or video stores) and streams the game video 130 to participant devices 180, for example as illustrated in FIG. 4. In some embodiments, the game video source 100 may present one or more user interfaces and/or application programming interfaces (UIs/APIs 102) to the participant devices 180.

In some embodiments, the participant devices 180 in a game environment may include player device(s) and/or spectator device(s). A player device may include, but is not limited to, input and output components and client software for a game via which respective players can participate in a game being executed by a game system. The players may view video 130 of the current game and/or video of previously recorded games via the player devices. A spectator device may include, but is not limited to, input and output components and client software via which one or more spectators may watch video 130 of current or live games and/or video of previously recorded game sessions presented by a game video source 100 such as a game system or spectating system.

In some embodiments, one or more players may act as broadcasters in a spectating system environment, and their respective player devices may be configured as broadcaster devices. In addition to client software for a game, each broadcaster device may also include input and output components (e.g., video cameras and microphones) and broadcasting client software for the spectating system via which respective players acting as broadcasters may generate live A/V streams of their online game play and commentary for broadcasting to spectators via the spectating system.

Figure 15:
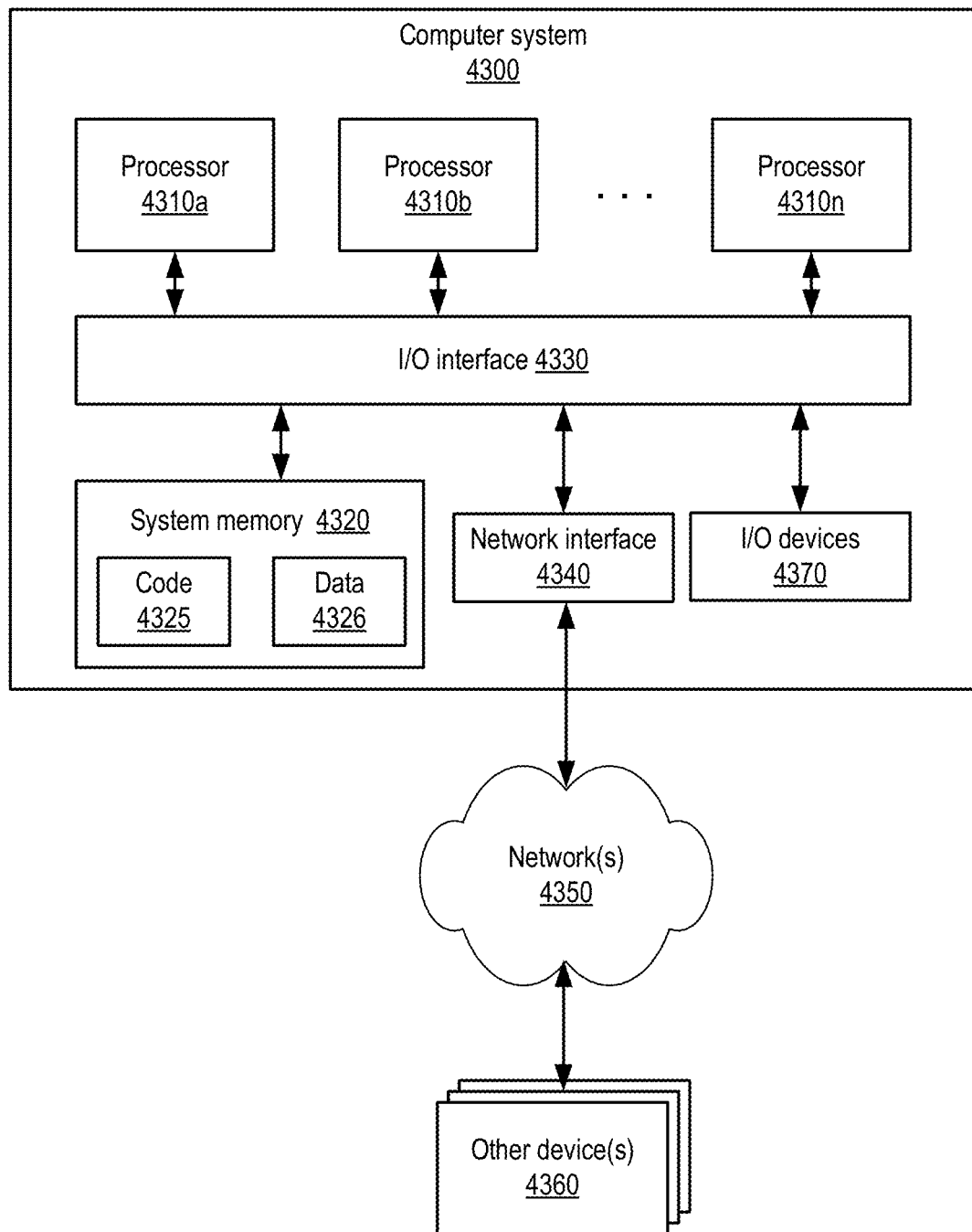
FIG. 15 is a block diagram illustrating an example computer system that may be used in embodiments.

In the game environment as illustrated in FIG. 1A, a game information system 120 may be located logically between the game video source 100 and the participant devices 180. The game information system 120 may be implemented by one or more computing devices, for example computer systems as illustrated in FIG. 15. The game information system 120 may be a component of the game video source 100 system or service or a separate, stand-alone system or service that obtains live or playback game video 130 targeted at participant devices 180, and that may also obtain game metadata 132A (e.g., graphical, textual, or other information related to the game video 130) from the game video source 100 and/or from one or more other sources. A game video analysis 124 component or module of the game information system 120 may analyze the video 130 and/or metadata 132A to locate game content (e.g., game characters, objects, and/or items, environmental content such as levels, maps, game boards, and so on) in at least a portion of the video 130, for example content of a scene including a sequence of two or more frames of the video 130. The game information system 120 may generate additional metadata according to the located content and provide the metadata to one or more of the participant devices 180 with the game metadata 132A received from the game video source 100 as game metadata 132B. The additional metadata that is added to game metadata 132A to generate metadata 132B may, for example, include information indicating regions or areas of the video 130 corresponding to the located game content, graphical and/or textual information related to the located game content, or other types of metadata. The graphical and/or textual information related to the located game content may, for example, include information about located game content such as game characters, objects, and/or items, environmental content such as levels, maps, game boards, and so on, and may also include information about game players corresponding to the located game content. The live or playback game video 130 and game metadata 132B may be provided to the participant devices 180, for example via wired and/or wireless network connections.

To analyze the video 130 and/or metadata 132A, the game video analysis 124 module may access 150 game information (e.g., general game information 142, game character information 144, game object/item information 146, and/or game player information 148) from one or more game information sources 140, and may use the information in identifying particular content of the video and/or in providing the additional game metadata about the identified content. For example, in some embodiments, the game video analysis 124 module may locate content (e.g., an object, item, or character, environmental content such as levels, maps, game boards, and so on) in one or more frames of the video 130 using one or more image processing techniques and use machine vision techniques to identify the located content according to graphical assets (e.g., game-related images, reference images, 2D or 3D models, reference data or patterns, etc.) for game content (objects, items, or characters, environmental content such as levels, maps, game boards, and so on) related to the game; the graphical assets used to identify the located content may be locally stored or cached, obtained from the game video source 100, and/or obtained from one or more local or external game information sources 140. In some embodiments, information about the identified content may be obtained from a local store or cache of game information, from the game video source 100, and/or from one or more of the local or external game information sources 140. In some embodiments, the identified content may be mapped to a particular player or players according to information obtained from one or more of the sources 140, and information about the particular player(s) may be obtained from one or more of the sources 140. Metadata corresponding to the identified content may be generated according to at least some of the information obtained from the source(s) 140. The game information sources 140 may include sources 140 local to the game information system 120 (for example, a database of game-related information stored by the system 120) and/or sources 140 external to the system 120 (for example, stores of information related to games provided by game system vendors or stores of game information maintained and provided by other external entities).

At a participant device 180, game video 130 may be displayed to a game video window 184 on a display 182 component of the device 180. Game metadata 186 may also be displayed to the display 182 component. In some embodiments, at least some of the game metadata 186 may be overlaid on the game video displayed in the game video window 184, for example information indicating regions or areas of the video 130 corresponding to located game content and/or graphical and/or textual information related to the located game content. In some embodiments, at least some of the game metadata 186 may be displayed in a separate location, window, or pane from the game video window 184. For example, one or more user interface elements may display graphical and/or textual information related to the located game content. In some embodiments, a participant device 180 may include two or more display 182 screens, and at least some of the game metadata 186 may be displayed on a different screen than the game video window 184.

At a participant device 180, a participant may interact with the displayed game video 184 and/or game metadata 186, for example using a cursor control device, a touchscreen, or voice control if provided. A game player may also interact with game controls of respective player devices. Participant interactions 160A may be obtained by a participant interaction processing 126 component of the game information system 120. At least some of the participant interactions 160B, for example game control interactions received from a player device, may be passed on to the game video source 100. Participant interactions 160C with game metadata 186 related to content of the video 130 (e.g., overlays, user interface elements, etc.) may be identified and used to locate and obtain additional information 162 about the respective content from one or more sources 140. For example, a participant may interact with an overlay or user interface element corresponding to a game character, object, or item, and additional information 162 about the game character, object, or item may be obtained from one or more sources 140. In some embodiments, the additional information 162 may include information identifying and describing one or more players associated with the character, object, or item in the current game session and/or in other game sessions. At least some of the information 162 may be provided to one or more of the participant devices 180 for display as game information 188, for example graphical and/or textual information related to a game character, object, or item associated with the overlay or user interface element with which the participant interacted. In some embodiments, at least some of the game information 188 may be overlaid on the game video displayed in the game video window 184. In some embodiments, at least some of the game information 188 may be displayed in a separate location, window, or pane from the game video window 184. For example, one or more user interface elements may display graphical and/or textual information related to the respective game content. In some embodiments, a participant device 180 may include two or more display 182 screens, and at least some of the game information 188 may be displayed on a different screen than the game video window 184.

In some embodiments, instead of or in addition to the game video analysis 124 module analyzing game video 130 when received from the game video source 130, the participant interaction processing 126 module may identify interactions with the game video displayed in window 184 and provide the participant interactions 160C to the game video analysis 124 module. The game video analysis 124 module may locate and identify game content (e.g., characters, items, or objects, environmental content such as game levels, maps, game boards, and so on) corresponding to the interactions 160C and provide game content information 134 to the participant interaction processing 126 module. The participant interaction processing 126 module may then obtain information about the identified content from one or more of the game information sources 140. In some embodiments, the identified content may be mapped to a particular player according to information obtained from one or more of the sources 140, and information about the player may also be obtained from one or more of the sources 140. At least some of the information 162 may be provided to one or more of the participant devices 180 for display as game information 188, for example graphical and/or textual information related to the game content with which the participant interacted. In some embodiments, at least some of the game information 188 may be overlaid on the game video displayed in the game video window 184. In some embodiments, at least some of the game information 188 may be displayed in a separate location, window, or pane from the game video window 184. For example, one or more user interface elements may display graphical and/or textual information related to the game content with which the participant interacted. In some embodiments, a participant device 180 may include two or more display 182 screens, and at least some of the game information 188 may be displayed on a different screen than the game video window 184.

Figure 1B:
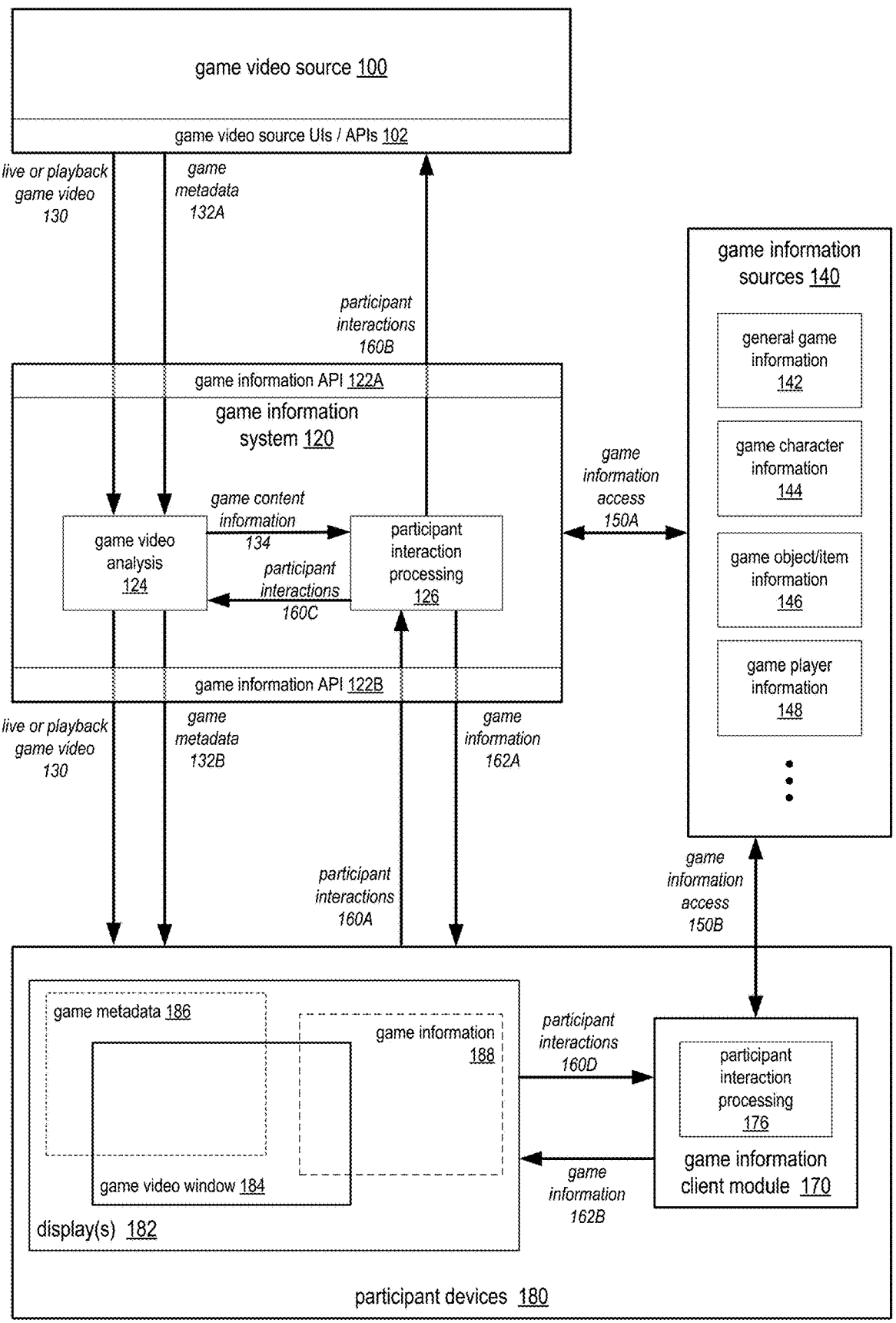
FIG. 1B is a block diagram that illustrates a game information system or service that includes a client module on participant devices in a game environment, according to some embodiments.

FIG. 1B is a block diagram that illustrates a game information system or service that includes a client module on at least some participant devices in a game environment, according to some embodiments. The game environment may be similar to the game environment as illustrated in FIG. 1A with a game information system or service 120 located logically between a game video source 100 and participant devices 180 that analyzes game video 130 to locate game content, generates additional game metadata related to the game, and processes participant interactions with game metadata and/or video as described in reference to FIG. 1A. However, at least some of the participant devices 180 may include an instance of a game information client module 170 that may perform at least some of the participant interaction processing 176 for the game information system 120. For example, the game information client module 170 may obtain and process participant interactions 160D with game metadata 186 related to game content in the video displayed in the game video window 184, and may access 160B additional information about the respective game content (characters, objects, items, environmental content such as levels, maps, game boards, and so on) or information about game players associated with the game content from one or more game information sources 140. The additional information, for example graphical and/or textual information related to a game character, object, item, or player associated with the overlay or user interface element with which the participant interacted, may be displayed as game information 188. In this embodiment, game information sources 140 may include, but are not limited to, a local game information store or cache on the respective participant device 180.

Figure 2:
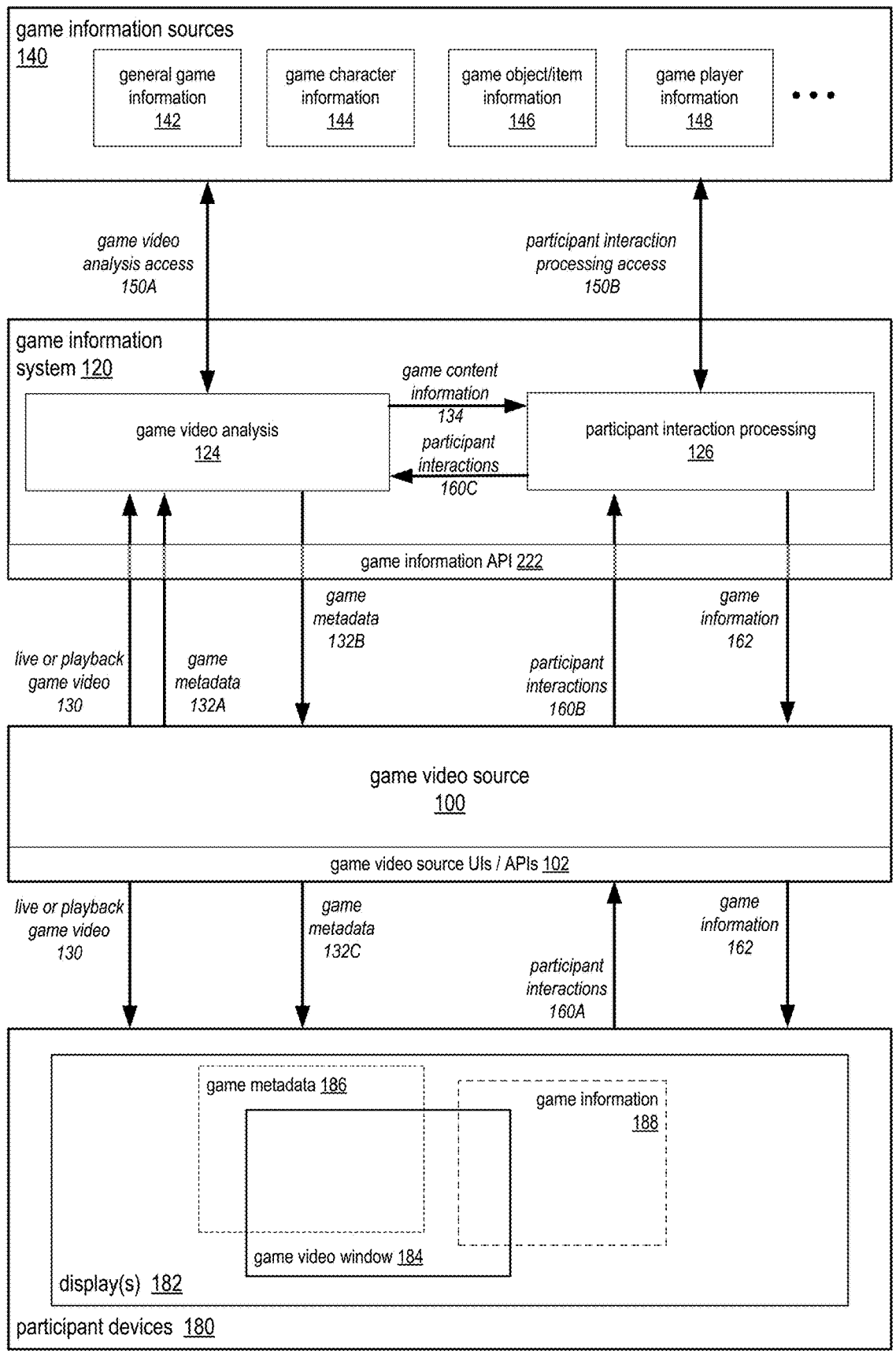
FIG. 2 is a block diagram that illustrates a game information system or service accessed by a game video source in a game environment, according to some embodiments.

FIG. 2 is a block diagram that illustrates a game information system or service that is accessed by game video sources in a game environment, according to some embodiments. The game environment may be similar to the game environment as illustrated in FIGS. 1A and 1B, and may include a game video source 100, participant devices 180, and a game information system or service 220. However, instead of the game information system 120 being located logically between the game video source 100 and participant devices 180 as shown in FIGS. 1A and 1B, the game information system 120 is a backend service or system that may be accessed by one or more game video sources 100 according to a game information API 222 to locate game content in live or playback game video 130, generate additional game metadata 132B related to the game, and process participant interactions 160B with game metadata 186 and/or game video 130. In some embodiments, at least some of the participant devices 180 may include an instance of a game information client module as illustrated in FIG. 1B that may perform at least some of the participant interaction processing for the game information system 120.

FIG. 3 is a block diagram that illustrates a game environment in which a game information module 320 is implemented in or by a game system 300, according to some embodiments. In some embodiments, a game information module 320 may be provided by a third party developer to game developers for inclusion in their game systems 300, for example as a plug-in module. Alternatively, a game information module 320 may be implemented as a component of the game system 300 by the game developer. In some embodiments, the game system 300 may include one or more game or playback modules 310 that may execute a current game session and/or play back previously recorded game sessions. Game or playback modules 310 may provide live or playback game video 330 to participant devices 380, which may include player and/or spectator devices. In some embodiments, the game system 300 may present one or more user interfaces and/or application programming interfaces (UIs/APIs 302) to the participant devices 380 via which players may participate in a game being executed by module 310 and/or via which spectators may view current or previously recorded game sessions. The game video 330 and game metadata 332A may be analyzed by a game information module 320 to generate additional game metadata; game metadata 332C, including game metadata 332A and additional game metadata 332B, may be provided to one or more of the participant devices 380 for display. Participant interactions 360A, which may include interactions with the game video 330A, game metadata 332C, or game controls, may be received by module 310. At least some of the interactions 360B may be provided to the game information module 320, which may process the interactions 360B to obtain information 362A about game content from one or more game information sources 340. At least some of the information 362B may be provided to at least some of the participant devices 380 for display. In some embodiments, at least some of the participant devices 380 may include an instance of a game information client module as illustrated in FIG. 1B that may perform at least some of the participant interaction processing for the game information module 320.

FIG. 4 is a block diagram that illustrates a game environment in which a game information module is implemented in or by a spectating system, according to some embodiments. A game spectating environment as shown in FIG. 4 may include a spectating system or service 400 and one or more game systems 430. Each game system 430 may implement game logic (e.g., a game engine) and serves as an execution environment for a respective game. A game system 430 may provide a game UI/API to the game system functionality to broadcaster/player devices 470 in the game spectating environment. The spectating environment of FIG. 4 may include multiple participant devices that include broadcaster/player devices 470 for broadcasting game play to spectators via the game spectating system 400, and spectator devices 480 for viewing the broadcasts via the game spectating system 400. The broadcaster/player devices 470 may also include one or more player devices 470 used by players that participate in the game but that do not act as broadcasters.

Each broadcaster/player device 470 may include, but is not limited to, input and output components and game client software for at least one game via which respective players can participate in game sessions currently being executed by the game system(s) 430 via game I/O 434. Each broadcaster/player device 470 may also include input and output components (e.g., video cameras and microphones) and broadcasting client software for the spectating system 400 via which respective players acting as broadcasters may generate live A/V streams of their online game play and commentary for broadcasting to spectators via the game spectating system 400. Each spectator device 480 may include, but is not limited to, input and output components and spectating client software via which respective spectators may interact with the spectating system 400 to select, receive, and view live broadcasts from the broadcasters or playbacks of previously recorded broadcasts, and via which the spectators may interact 482 with content of the live or playback broadcasts.

In some embodiments, spectating system 400 may be a network-based video streaming system that may allow players to broadcast live streams of their online game play to tens, hundreds, thousands or more spectators, while allowing the spectators to select the broadcasts of particular players (also referred to as channels) for viewing. A spectating system 400 may support live broadcasts for one, two, or more different game systems 430, and may support live streaming of broadcasts from tens, hundreds, or thousands of broadcaster/player devices 470 to the spectator devices 480. In some embodiments, a spectating system 400 may record at least some live broadcasts and allow the recorded broadcasts to be played back for viewing by spectators.

While FIG. 4 shows game systems 430 as separate from spectating service 400, in some embodiments, at least one game system 430 may be implemented at least in part by spectating service 400. In some embodiments, one or more broadcaster/player devices 470 may be implemented within spectating system 400. In some embodiments, at least some components of a spectating environment as shown in FIG. 4 may be implemented in the context of a service provider that provides virtualized resources on a provider network to clients of the service provider, for example as illustrated in FIG. 14. For example, the spectating system 400 and/or game information module 420 may be implemented as services on a provider network as illustrated in FIG. 14, and one or more game systems 430 may be implemented by game providers on the provider network.

In some embodiments, a spectating system 400 may support broadcasts of live and/or recorded digital media content via broadcaster/player devices 470 from sources other than game systems 430. For example, in some embodiments, the spectating system 400 may support live or recorded broadcasts of streams from sports games, competitions, concerts, and other events including but not limited to live streams from electronic spectator sports (eSports) competitions. eSports (also referred to as competitive gaming) generally refers to organized multiplayer video game competitions. For example, video cameras and audio equipment may be installed in an arena or other venue in which an event such as a sports game or an eSports competition is being held. Video and/or audio feeds from the equipment may be input to one or more broadcaster devices 470 that may composite and stream the audio/video (A/V) inputs to the spectating system 400. For eSports events, game A/V may be added to the stream along with the feeds from the cameras and audio equipment. Commentators and/or broadcasters may input their audio, text, and/or video content into the stream as well. The live stream may be broadcast to spectator devices 480 by the spectating system 400, and/or may be recorded for rebroadcast. Spectators may view the broadcast on spectator devices 480, and may also interact with content of the broadcasts via spectating system clients on their respective devices 480.

As shown in FIG. 4, the spectating system 400 may include at least a broadcast module 406 and a game information module 420, and may expose game system API(s) 402 to game system(s) 430, a broadcasting UI/API 404 to broadcaster/player devices 430, and a spectating UI/API 408 to spectator devices 480. The broadcast module 406 may obtain broadcast(s) 472 of current game play from broadcaster/player device(s) 430 and stream 476 the broadcast(s) 472 to one or more spectator devices 480. The broadcast module 406 may also stream previously recorded broadcasts (playback 474) to one or more spectator devices 480. The broadcast module 406 may provide game video 475 from broadcast(s) 472 or playback(s) 474 to game information module 420, which may analyze the game video 475 to locate and identify game content in the video 475, and may generate game metadata 432 for the located content and provide the game metadata 432 to the broadcast module 406. The game information module 420 may access one or more game information sources 440 to obtain information for use in in analyzing the game video 475 to locate and identify content. While not shown, in some embodiments the game information module 420 may obtain game metadata from game system(s) 420 for use in analyzing the game video 475 to locate and identify content. The broadcast module 406 may include the game metadata 432 in or with the broadcast or playback stream 476, for example as overlays on the game video and/or as user interface elements on a game spectating display.

The game information module 420 may obtain spectator interactions 482 with the game metadata 432 and/or with game video displayed on the spectating devices 480. For an interaction 482 with game metadata 482, the game information module 420 may obtain additional information from one or more game information sources 440 and provide the information 484 to the respective spectator device 480 for display. For an interaction 482 with game video, the game information module 420 may analyze a portion of the video at or near the interaction to identify game content in the video, obtain information for the identified game content from one or more game information sources 440, and provide the information 484 to the respective spectator device 480 for display.

In some embodiments, the game information module 420 may also obtain payer interactions 472 with game metadata and/or with game video displayed on the broadcaster/player devices 430, for example from game system(s) 420. For an interaction 482 with game metadata, the game information module 420 may obtain additional information from one or more game information sources 440 and provide the information 474 to the game system 420, which may provide the information to a respective broadcaster/player device 430 for display. For an interaction 472 with game video, the game information module 420 may analyze a portion of the video at or near the interaction to identify game content in the video, obtain information for the identified game content from one or more game information sources 440, and provide the information 474 to the game system 420, which may provide the information to a respective broadcaster/player device 430 for display.

In some embodiments, at least some of the broadcaster/player devices 430 and/or spectator devices 480 may include an instance of a game information client module as illustrated in FIG. 1B that may perform at least some of the participant interaction processing for the game information module 420.

Figure 5:
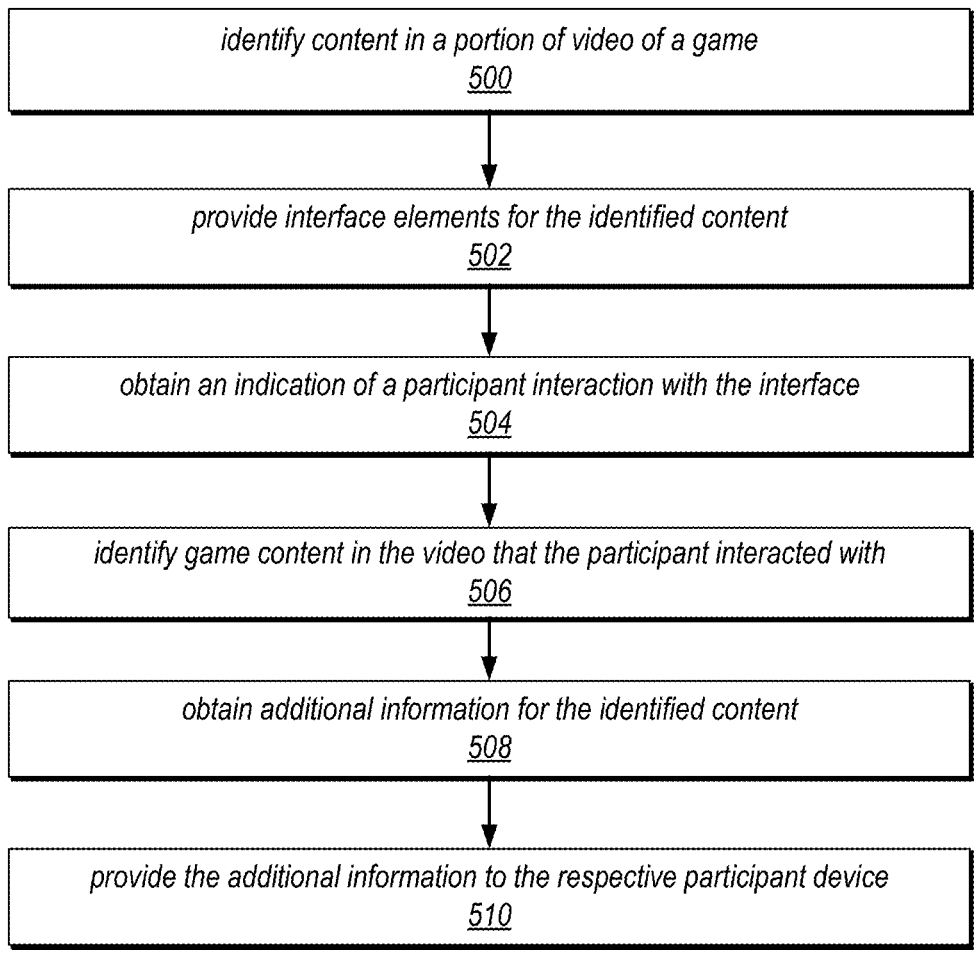
FIG. 5 is a flowchart of a method for providing game information to participants in a game environment, according to some embodiments.

FIG. 5 is a high-level flowchart of a method for providing game information to participants in a game environment, according to some embodiments. The method of FIG. 5 may, for example, be implemented in any of the game environments illustrated in FIGS. 1A through 4.

As indicated at 500, a game information system may identify content (e.g., characters, objects, items, environmental content such as levels, maps, game boards, etc.) in a portion of video of a game. For example, the game information system may obtain video from a game video source, and an indication of a point in the game video, for example a point in the game at which a respective participant paused the video or otherwise interacted with the video. To identify the content, the game information system may apply one or more image processing techniques to one or more frames of the video at or near the indicated point in the game video to locate the content in the frames. A machine vision technique may then be applied to the located content to identify the located content in graphical assets related to game content (e.g., bitmap or vector images, 2D or 3D models, or other descriptive information for objects, items, characters, or environmental content) related to the game obtained from one or more game information sources. In some embodiments, game metadata, for example metadata obtained from a game system, may instead or also be used in locating and identifying game content in the video. In some embodiments, other information, for example audio content of the game video stream, may be analyzed to locate and identify game content in the video.

As indicated at 502, interface elements may be provided for the located and identified content. For example, overlays for the video that correspond to the identified content of the video may be generated and provided to the respective participant device. As another example, graphical and/or textual information about the identified content may be generated and displayed to one or more user interface elements or windows on the participant device. In some embodiments, audio information about the identified content may be provided instead of or in addition to the visually presented information.

As indicated at 504, the game information system may obtain an indication of a participant interaction with the game interface. For example, the participant may interact with an overlay region of the displayed video that corresponds to an identified character, object, or item in the video. As another example, the participant may interact with a user interface element or window that displays graphical and/or textual information about an identified character, object, or item in the video.

As indicated at 506, the game information system may identify game content in the video that the participant interacted with, for example according to the overlay region or user interface element that the participant interacted with. As indicated at 508, the game information system may obtain additional information for the identified content from one or more game information sources. As indicated at 510, the additional information for the identified content may be provided to the respective participant device for display. In some embodiments, the additional information may include, but is not limited to, information identifying and describing at least one player associated with the respective game content; statistics (e.g., usage statistics) in the game or across two or more games for a respective character, object, item, or player; history or backstories for a respective character, object item, or player; comparisons of a respective character, object, item, or player to other characters, objects, item, or player within or associated with the game; information on environmental content such as game boards, game levels, game maps, and so on; tutorials, hints, or other types of reference data for the game or game play; or in general any information that may be obtained or generated for game content such as game characters, objects, items, environmental content, or the players associated with the respective game or game content.

Figure 6:
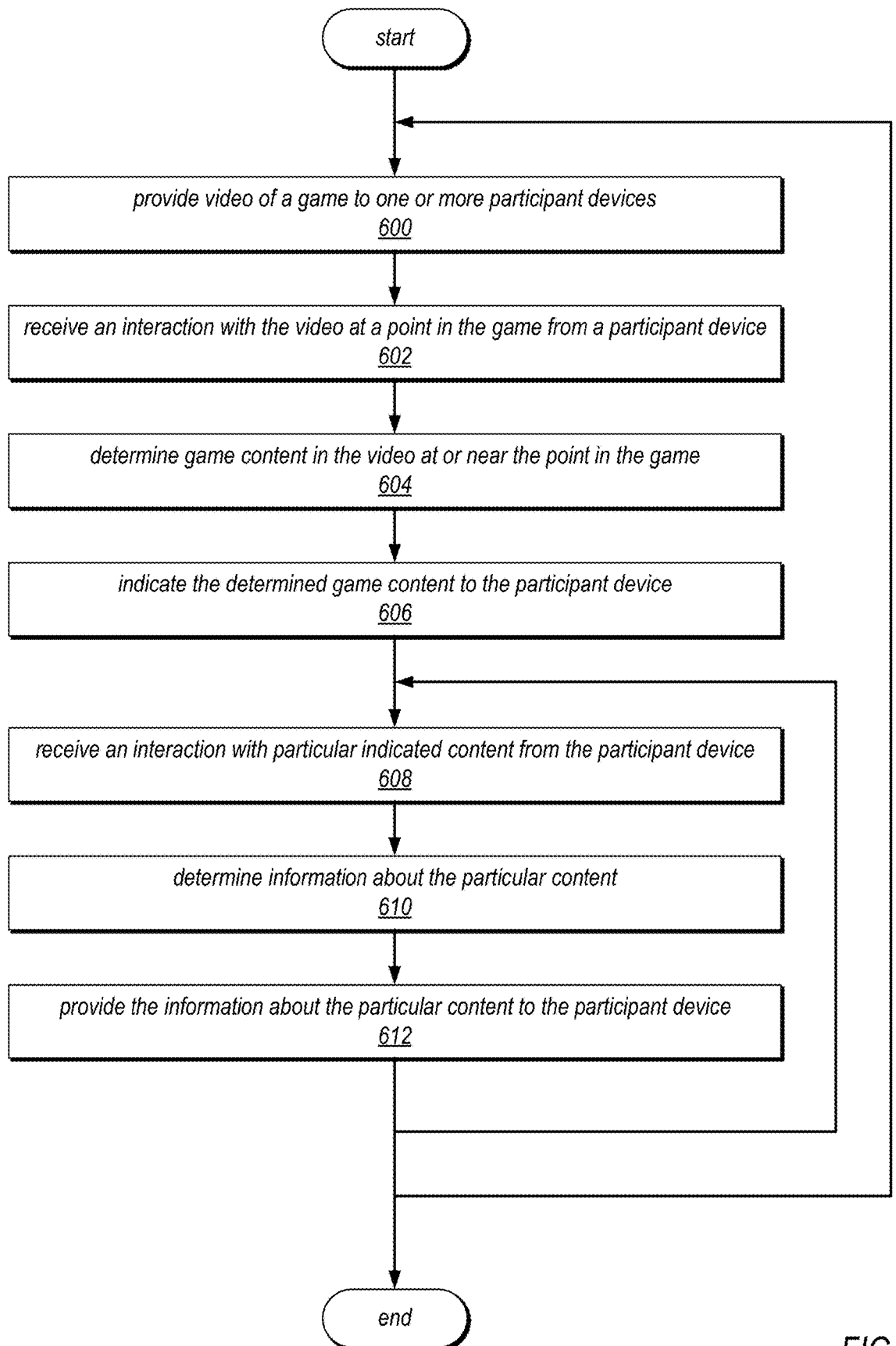
FIG. 6 is a flowchart of a method for determining game content and providing game information for the determined game content to participants in a game environment, according to some embodiments.

FIG. 6 is a flowchart of a method for determining game content and providing game information for the determined game content to participants in a game environment, according to some embodiments. The method of FIG. 6 may, for example, be implemented in any of the game environments illustrated in FIGS. 1A through 4.

As indicated at 600, video of a game may be provided to one or more participant devices, for example from a game system as illustrated in FIG. 3 or from a spectating system as illustrated in FIG. 4. As indicated at 602, the game information system may obtain an interaction with the video at a point in the game from a participant device. For example, a participant may pause the video at a point in the game, or click or tap on the video or on a user interface element at a point in the game, to generate the interaction.

Figure 7A:
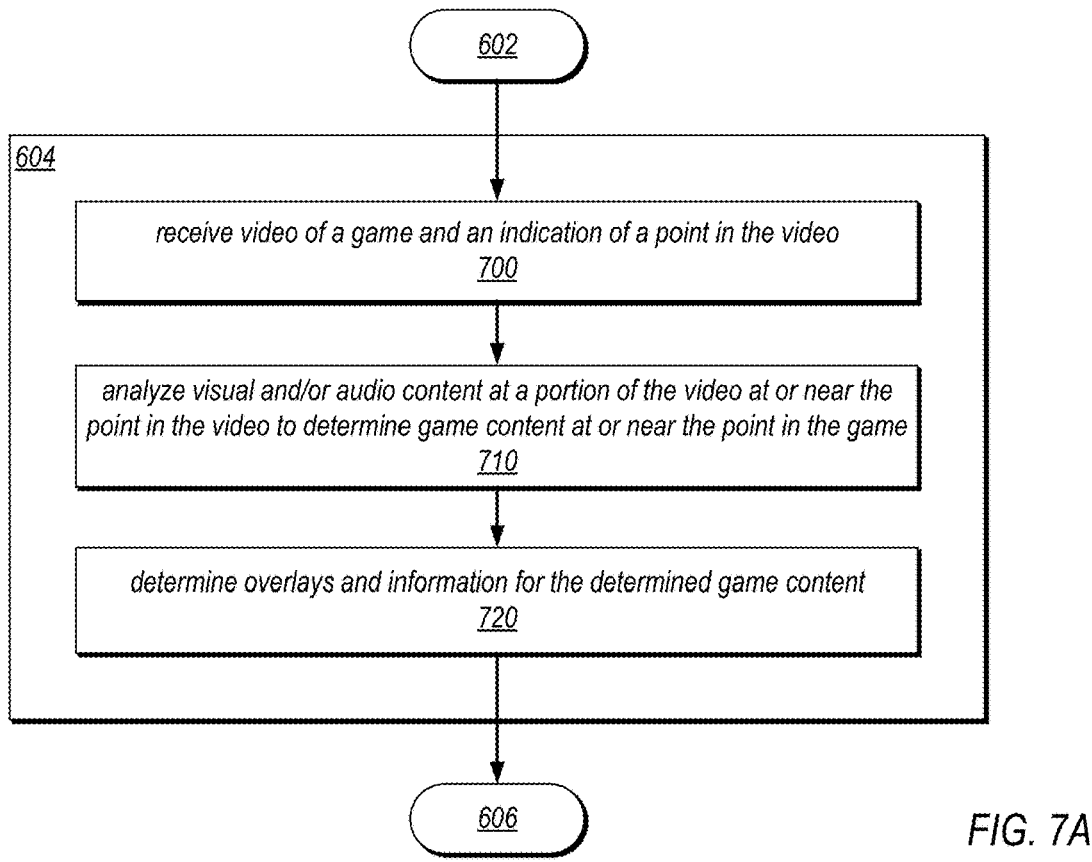
FIGS. 7A and 7B are flowcharts of methods for determining game content, according to some embodiments.
Figure 7B:
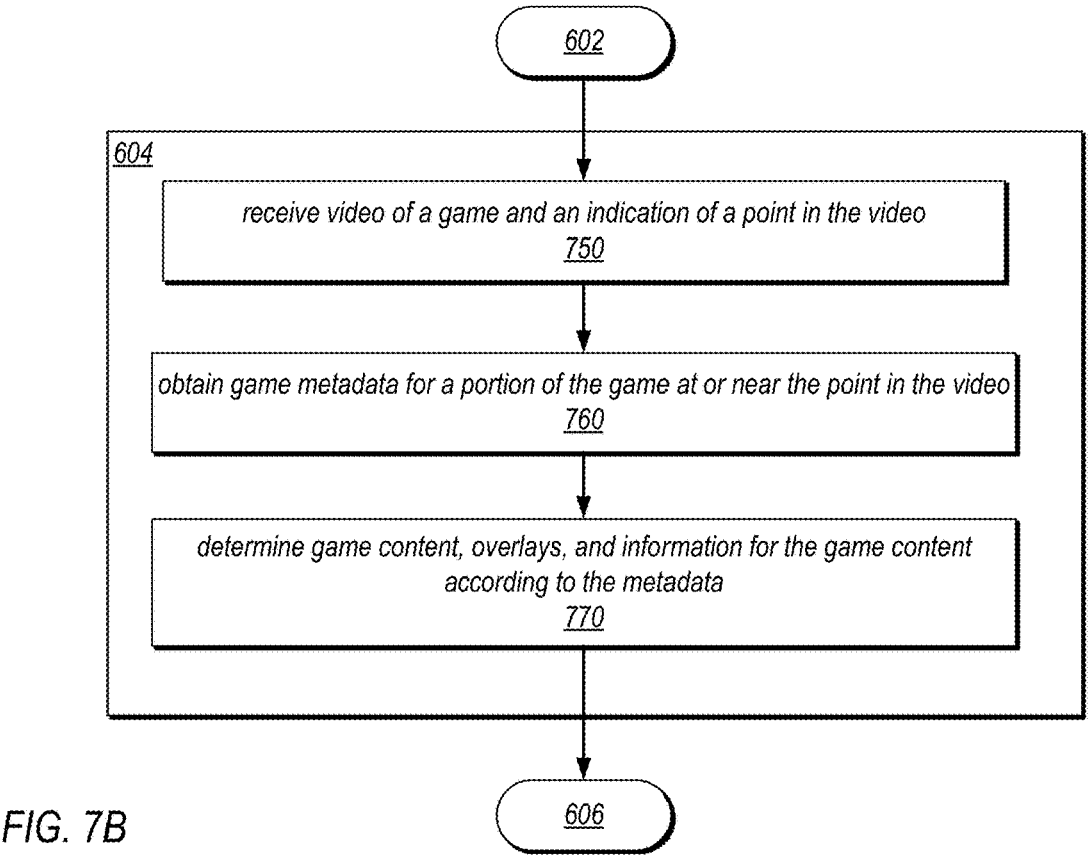

As indicated at 604, the game information system may determine game content in the video at or near the point in the game. For example, the game information system may apply one or more image processing techniques to one or more frames of the video at or near the point in the game to locate the content in the frames. A machine vision technique may then be applied to the located content to identify the located content in images of content (e.g., images of objects, items, or characters, environmental content such as levels, maps, game boards, and so on) related to the game obtained from one or more game information sources. In some embodiments, game metadata, for example metadata obtained from a game system, may instead or also be used in locating and identifying game content in the video at or near the point in the game. In some embodiments, other information, for example audio content of the game video stream, may be analyzed to locate and identify game content in the video at or near the point in the game. FIGS. 7A and 7B are flowcharts of example methods for determining game content in video that may be used at element 604 of FIG. 6.

As indicated at 606, the determined game content may be indicated to the participant device. For example, overlays for the video that correspond to the identified content of the video may be generated and provided to the respective participant device. As another example, graphical and/or textual information about the identified content may be generated and displayed to one or more user interface elements or windows on the participant device.

As indicated at 608, an interaction with particular indicated content may be received from the participant device. For example, the participant may interact with an overlay region of the displayed video that corresponds to an identified character, object, or item in the video. As another example, the participant may interact with a user interface element or window that displays graphical and/or textual information about an identified character, object, or item, or about environmental content such as levels, maps, game boards, and so on, in the video.

As indicated at 610, the game information system may determine information about the particular content. For example, the game information system may query one or more game information sources to obtain additional information about the particular content. As indicated at 612, the information about the particular content may be provided to the participant device for display. In some embodiments, the additional information may include, but is not limited to, information identifying and describing at least one player associated with the respective game content; statistics (e.g., usage statistics) in the game or across two or more games for a respective character, object, item, or player; history or backstories for a respective character, object item, or player; comparisons of a respective character, object, item, or player to other characters, objects, item, or player within or associated with the game; information on environmental content such as game boards, game levels, game maps, and so on; tutorials, hints, or other types of reference data for the game or game play; or in general any information that may be obtained or generated for game content such as game characters, objects, items, environmental content, or the players associated with the respective game or game content.

As shown by the arrow from element 612 leading back to element 608 of FIG. 6, the participant may interact with other indicated content to obtain information about the other content, and in some embodiments may also interact with the information about particular content provided at element 612 to obtain further information related to the particular content. As shown by the arrow from element 612 leading back to element 600 of FIG. 6, the participant may continue the video, and may interact with the video at other points in the game to obtain information about content of the game at those other points.

FIG. 7A is a flowchart of a method for determining game content from visual and/or audio content of a video, according to some embodiments. The method of FIG. 7A may, for example, be used at element 604 of FIG. 6 in determining game content in video of a game.

As indicated at 700, a game video analysis component of the game information system may receive video of a game and an indication of a point in the video. The video may include a sequence of frames that include visual content of the game. The video may also include audio content of the game, for example spoken words or phrases of characters in the sequence of frames, or sound effects generated by objects, items, characters, or events in the game.

As indicated at 710, the game video analysis component of the game information system may analyze visual and/or audio content at a portion of the video at or near the point in the video to determine game content at or near the point in the game. For example, the game video analysis component may apply one or more image processing techniques to one or more frames of the video at or near the point in the game to locate the content in the frames. A machine vision technique may then be applied to the located content to identify the located content according to graphical assets (e.g., game-related images, reference images, 2D or 3D models, reference data or patterns, etc.) for game content (e.g., objects, items, characters, environmental content such as levels, maps, game boards, and so on) related to the game; the graphical assets used to identify the located content may be obtained from a local store or cache of game information, obtained from the game video source 100, and/or obtained from one or more local or external game information sources 140. The game video analysis component may instead or also analyze audio content at or near the point in the game to identify game content. For example, audio assets such as audio clips of speech from character(s) in a portion of the game video at or near the point may be compared to audio clips of known characters in the game obtained from one or more game information sources to match the audio content to particular characters. Similarly, audio assets such as audio clips of sound effects from a portion of the game video at or near the point may be compared to known sound effects for objects or items in the game to match the sound effects to particular objects or items. As another example, audio assets such as audio clips of sound effects from a portion of the game video at or near the point may be compared to known audio clips of sound effects for levels or locations in the game to match the sound effects to particular environmental content. In some embodiments, a combination of the video analysis information and the audio analysis information may be used to increase confidence in an identification of particular content in the video sequence at or near the point in the game.

As indicated at 720, the game information system may determine overlays and information for the determined game content. For example, regions in the frames corresponding to identified content may be used to generate overlays for the video. As another example, information may be obtained from one or more local or external sources (e.g., a local store or cache of game information, a game video source, and/or one or more external game information sources such as data stores of game-related information, game information vendors, or websites) according to the content identified by the audio and/or visual analysis of the video sequence.

FIG. 7B is a flowchart of a method for determining game content from game metadata, according to some embodiments. The method of FIG. 7B may, for example, be used at element 604 of FIG. 6 in determining game content in video of a game. The method of FIG. 7B may be used alone or in combination with the method of FIG. 7A to determine game content in a sequence of frames at or near a point in the game.

As indicated at 750, the game video analysis component of the game information system may receive video of a game and an indication of a point in the video. As indicated at 760, the game information system may obtain game metadata for a portion of the game at or near the point in the video, for example from the game system on which the game is being played, from a store of game metadata corresponding to previously recorded game video, from a third-party source, or from extraction and analysis of game metadata information embedded in the game video and/or audio content, for example as watermark data in video frames or inaudible signals in an audio track.

As indicated at 770, a game video analysis component of the game information system may determine game content, overlays, and information for the game content according to the game metadata. For example, the game metadata may identify at least some content in a sequence of frames at or near the point in the game, and may indicate locations in the video (e.g., regions within the frames) at which the content appears. Regions in the frames corresponding to content identified by the game metadata may be used to generate overlays for the video. Information may be obtained from one or more game information sources according to the content identified by the game metadata.

Figure 8:
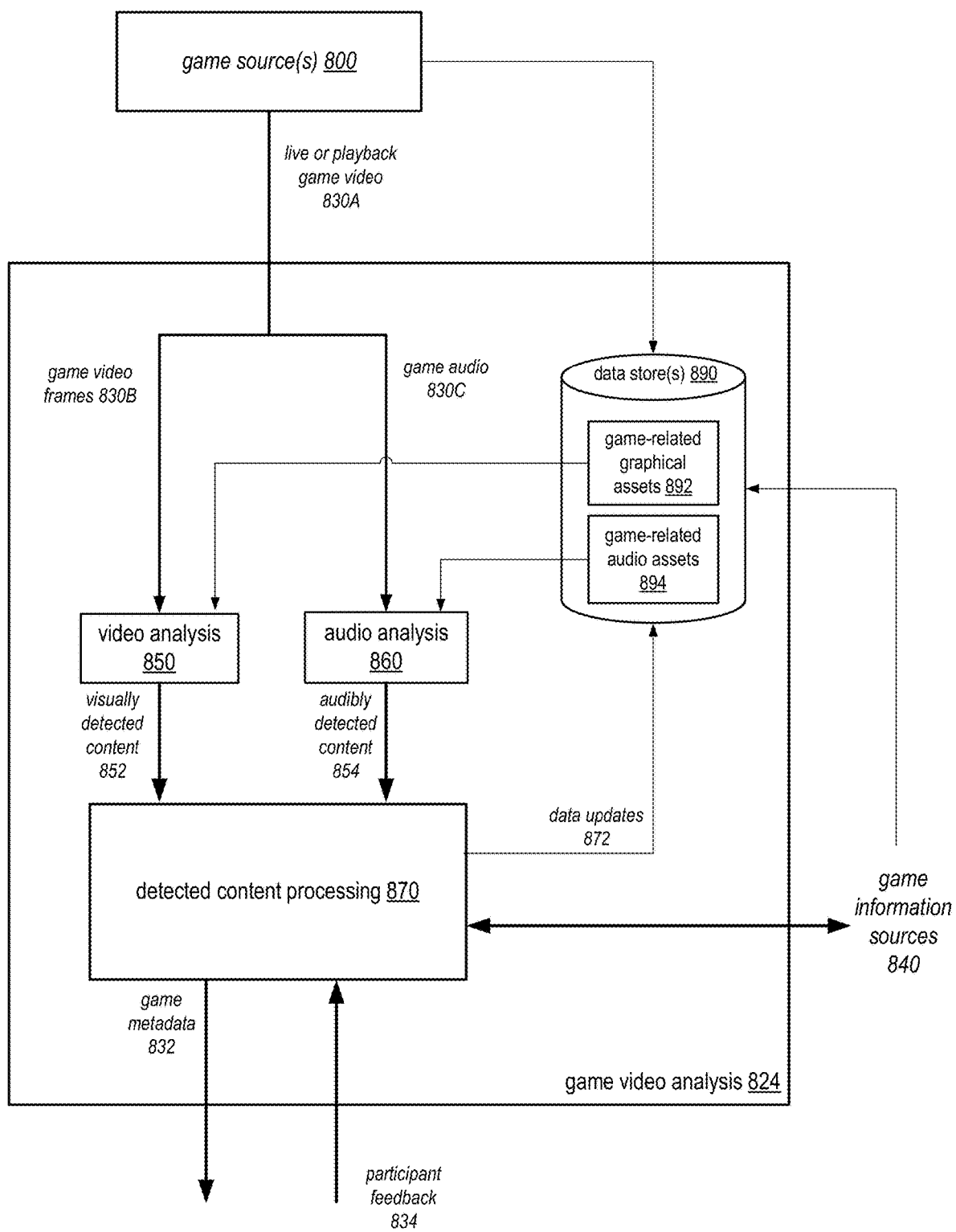
FIG. 8 is a block diagram that illustrates a game video analysis module that performs analysis of game video to detect game content, according to some embodiments.

FIG. 8 is a block diagram that illustrates a game video analysis module that performs analysis of game video to detect and identify game content, according to some embodiments. The game video analysis module 824 may, for example, implement the method as illustrated in FIG. 7A to locate and identify content in a portion of a live or prerecorded game video 830A. The game video analysis module 824 may, for example, be implemented by or in a game information system as illustrated in any of FIGS. 1A through 4.

The game video analysis module 824 may receive live or prerecorded video 830A of a game and an indication of a point in the video from a game source 800. The video 830A may include a sequence of frames 830B that include visual content of the game. The video may also include audio content 830C of the game, for example spoken words or phrases of characters in the sequence of frames 830B, or sound effects generated by objects, items, characters, or events in the game.

The game video analysis module 824 may analyze visual 830B and/or audio 830C content at a portion of the video at or near the point in the video 830B to detect and identify game content (e.g., characters, items, objects, etc., environmental content such as game levels, maps, game boards, and so on) at or near the point in the game. For example, a video analysis 850 component of the game video analysis module 824 may apply one or more image processing techniques to one or more frames 830B of the video at or near the point in the game to locate content 852 (e.g., characters, items, objects, etc., environmental content such as game levels, maps, game boards, and so on) in the frames. A machine vision technique may then be applied to the located content 852 to identify the located content 852 in game-related graphical assets 892 for known game-related content (e.g., bitmap or vector images, 2D or 3D models, or other descriptive graphical information for objects, items, or characters, or for environmental content such as game levels, maps, game boards and so on) maintained in one or more data stores 890 or obtained from other sources. While FIG. 8 shows the data store(s) 890 as part of the game video analysis module 824, in some embodiments the store(s) 890 may be at least in part external to the module 824.

In some embodiments, an audio analysis 860 component of the game video analysis module 824 may analyze audio content 830C at or near the point in the game to detect and identify game content 854 (e.g., characters, items, objects, environmental content such as game levels, maps, game boards, and so on). For example, audio clips of speech from character(s) in a portion of the game video at or near the point in the game may be compared to audio assets 894 such as audio clips of speech of known characters in the game maintained in one or more data stores 890 to match the audio content 830C to particular characters. Similarly, audio assets 894 such as audio clips of sound effects from a portion of the game video at or near the point may be compared to known audio clips of sound effects for objects or items in the game to match the sound effects to particular objects or items. As another example, audio assets 894 such as audio clips of sound effects from a portion of the game video at or near the point may be compared to known audio clips of sound effects for levels or locations in the game to match the sound effects to particular environmental content.

In some embodiments, a detected content processing 870 component of the game video analysis module 824 may receive indications of the visually detected content 852 and/or the audibly detected content and generate game metadata 832 for the detected content. For example, regions in the frames corresponding to detected content may be used to generate overlays for the video. As another example, information may be obtained from one or more game information sources 840 according to the content identified by the audio and/or visual analysis of the video sequence; the obtained information for the identified content may be used to generate graphical and/or textual overlays for the video or graphical and/or textual content for user interface elements or game information windows on the participant devices. In some embodiments, the detected content processing 870 component may use a combination of the video analysis information 852 and the audio analysis information 854 to increase confidence in an identification of particular content in the video sequence at or near the point in the game.

In some embodiments, game-related visual 892 and/or audio 894 information may be obtained from one or more game sources 800 and/or other information sources 840, and may be stored or cached in data store(s) 890. While FIG. 8 shows the data store(s) as part of the game video analysis module 824, in some embodiments the store(s) 890 may be at least in part external to the module 824. In some embodiments, the game video analysis module 824 may implement a machine learning technique in which the game-related visual 892 and/or audio 894 information stored in data store(s) 890 is updated 872 according to game content in the video identified by the game video analysis module 824. In some embodiments, the images 892 and/or audio clips 894 may each have a confidence value that indicates the level of confidence in the identity of the content associated with the respective images 892 and/or audio clips 894. The video analysis 850 component and/or audio analysis 860 component may generate a confidence value when identifying content in the video according to the confidence values of the respective images 892 and/or audio clips 894 used to identify the content. The detected content processing 870 component may combine these confidence values and may use the adjusted confidence value to update the confidence values of the respective images 892 and/or audio clips 894 if necessary. In addition, images and/or audio clips that are identified in the video with a confidence value over a threshold may be added 872 to the data store(s) 890 for use in identifying content in the future (in the same video or in other videos). Updating 872 the content of data store(s) 890 may allow the game video analysis module 824 to more quickly and accurately identify content in the video 830 being analyzed, as well as the content of other videos 830 that are processed in the future. In some embodiments, the detected content processing 870 component may receive feedback 834 from participants indicating the participants' opinion on the correctness of identified content in the video they are watching. This feedback 834 may, for example, be used to adjust the confidence value for the identified content, or to determine that a particular identification was correct or wrong.

In some embodiments, in addition to locating and identifying game content such as game characters, items, or objects in game video, environmental content such as game levels, maps, game boards, and so on, the game information system may be applied to locate and identify content of video that includes real-life people participating in sports, games, or other events, as well as objects, items, and environmental information associated with the sports, games, or events. In these embodiments, the game video analysis module 824 may analyze visual 830B and/or audio 830C content at a portion of the video at or near a point in the video 830B to locate and identify people (e.g., players, referees, etc.) items (e.g., game equipment), objects (e.g., goals, field lines and boundaries, etc.), environment (e.g., particular stadiums or other venues) at or near the point in the game. For example, the video analysis 850 component may apply a facial recognition technique to persons located in the video to identify the persons, and the audio analysis 860 component may apply a voice recognition technique to audio clips of speech to identify the speakers. The video and audio analysis techniques may be used in combination to increase confidence in the identifications. The game video analysis module 824 may generate overlays for the located content (e.g., players, game equipment, etc. in video of a sports event), and may obtain information for the identified content (e.g. names, history, statistics, etc. for the identified players in the sports event). For example, regions in the frames corresponding to located persons (e.g., players in a sports event) may be used to generate overlays for the video. As another example, information may be obtained from one or more game information sources 840 according to the content identified by the audio and/or visual analysis of the video sequence (e.g., history, statistics, etc. for players identified in the sports event).

Figure 9:
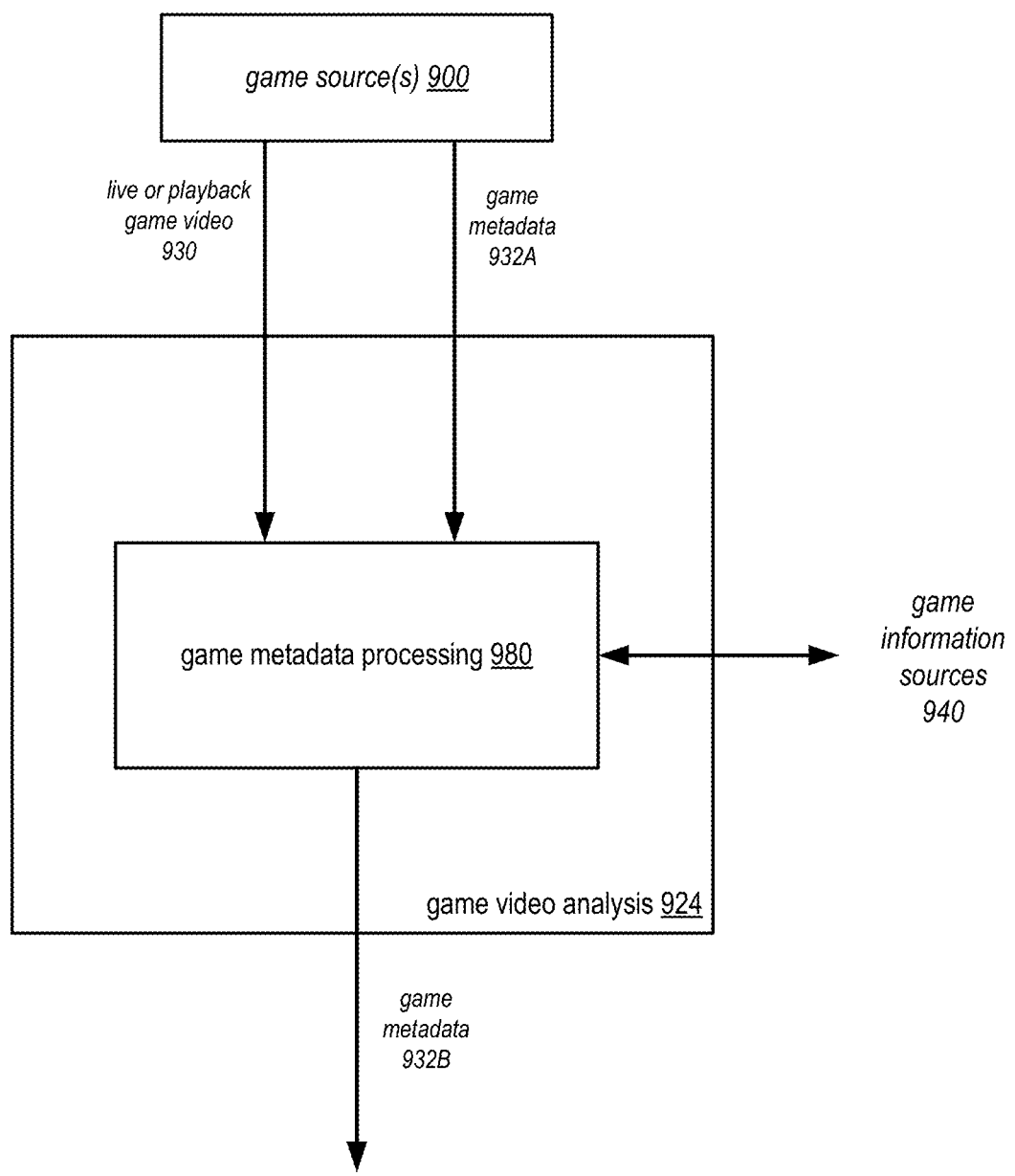
FIG. 9 is a block diagram that illustrates a game video analysis module that processes game metadata to detect game content, according to some embodiments.

FIG. 9 is a block diagram that illustrates a game video analysis module that processes game metadata to detect game content, according to some embodiments. The game video analysis module 924 may, for example, implement the method as illustrated in FIG. 7B to locate and identify content in a portion of a live or prerecorded game video 930A. The game video analysis module 924 may, for example, be implemented by or in a game information system as illustrated in any of FIGS. 1A through 4. In some embodiments, the game metadata processing 980 component of FIG. 9 may be used in combination with the components of the game video analysis module 824 of FIG. 8 to identify content in videos.

As shown in FIG. 9, the game video analysis module 924 may receive live or prerecorded video 930 of a game from a game source 800, and may also obtain game metadata 932A for a portion of the game at or near a point in the video from one or more sources, for example from the game system on which the game is being played from a store of game metadata corresponding to previously recorded game video, from a third-party source 940, or from extraction and analysis of game metadata information embedded in the game video and/or audio content 930, for example as watermark data in video frames or inaudible signals in an audio track. A game metadata processing 980 component of the game video analysis module 924 may determine game content in the video 930, and may generate overlays and obtain information for the game content according to the metadata 932A. For example, the game metadata 932A may identify at least some content in a sequence of frames at or near a point in the game, and may indicate locations in the video (e.g., regions within the frames) at which the content appears. Regions in the frames corresponding to content identified by the game metadata processing 980 component from the game metadata 932A may be used to generate game metadata 932B including overlays for the video 930. Additional game metadata 932B including but not limited to graphical and/or textual content for overlays and graphical and/or textual content for user interface elements or game information windows on the participant devices may be generated. Information for the game metadata 932B may be obtained from one or more game information sources 940 according to the content identified by the game metadata 932A.

While FIG. 8 illustrates a game video analysis module that performs analysis of game video and/or audio to detect and identify game content, and FIG. 9 illustrates a game video analysis module that processes game metadata to detect and identify game content, in some embodiments a game video analysis module may perform a combination of video and/or audio analysis of game video and processing of game metadata as described in FIGS. 8 and 9 to detect and identify game content.

Figure 10:
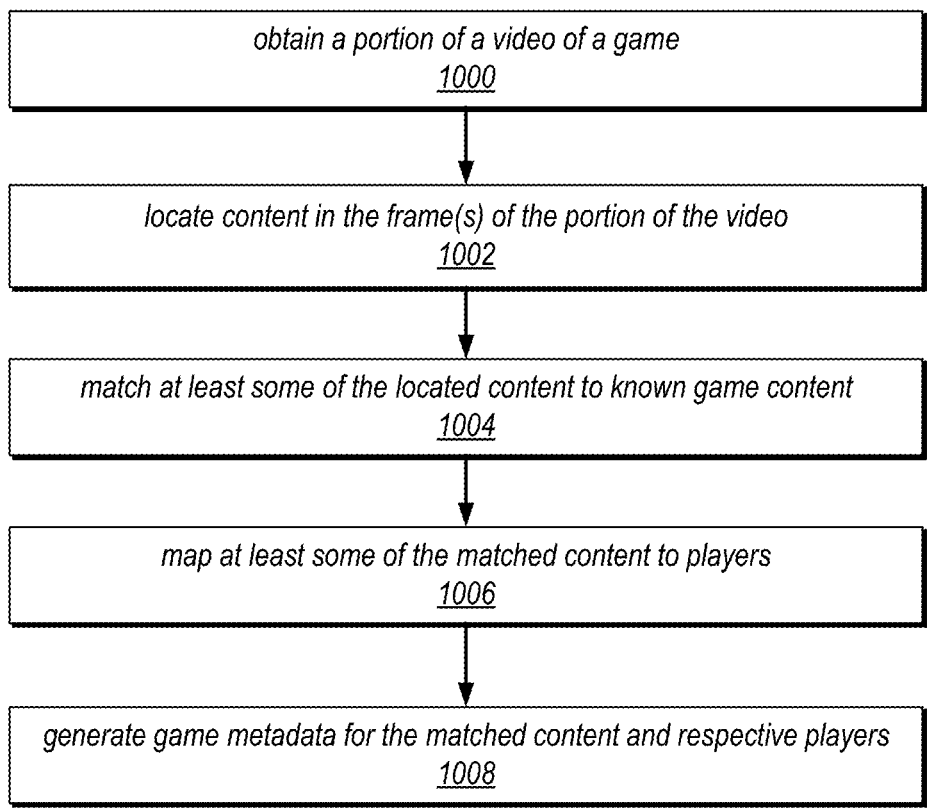
FIG. 10 is a flowchart of a method for analyzing game video to detect game content and to identify game players associated with the content, according to some embodiments.

In some embodiments, the game information system may identify players associated with located and identified content (e.g., characters, objects, items, environmental content, etc.) in live or prerecorded game video, and may provide information about the identified content and associated players to participant devices. FIG. 10 is a flowchart of a method for analyzing game video to detect game content and to identify game players associated with the content, according to some embodiments. The method of FIG. 10 may, for example, be applied in a game video analysis module as illustrated in FIGS. 8 and 9.

As indicated at 1000, a game video analysis module of a game information system may obtain a portion of a video of a game. The video may be live video or prerecorded video. As indicated at 1002, the game video analysis module may locate content in the frame(s) of the portion of the video, for example as described in reference to FIGS. 7A and 8. As indicated at 1004, the game video analysis module may match at least some of the located content to known game content, for example as described in reference to FIGS. 7A and 8.

As indicated at 1006, the game video analysis module may map at least some of the matched content to one or more game players. Each player may have an identifier, name, or handle that uniquely identifies the particular player. For example, information about particular identified content (e.g., a particular game character) may be obtained that indicates one or more players that are associated with the particular content, for example players that are known to use the particular content. As another example, metadata may be obtained that indicates what players are participating in a particular scene of the game that is currently being analyzed, and this information may be used in mapping the content of the scene to the particular players. As another example, voice analysis of an audio track of the video may be used to identify players involved in a scene or in associating the players with particular content in the scene. As another example, video or images of the players actually playing the game may be obtained, and facial recognition techniques or other techniques may be used to identify the players; this information may be used to associate the players with the scene or in associating the players with particular content in the scene.

As indicated at 1008, the game video analysis module may generate game metadata for the matched content and respective players. For example, regions in the frames corresponding to the matched content may be used to generate overlays for the video. As another example, information about the content and/or players may be obtained from one or more game information sources according to the identified content and associated players. The obtained information for the identified content and/or players may be used to generate graphical and/or textual overlays for the video or graphical and/or textual content for user interface elements or game information windows on the participant devices.

Figure 11:
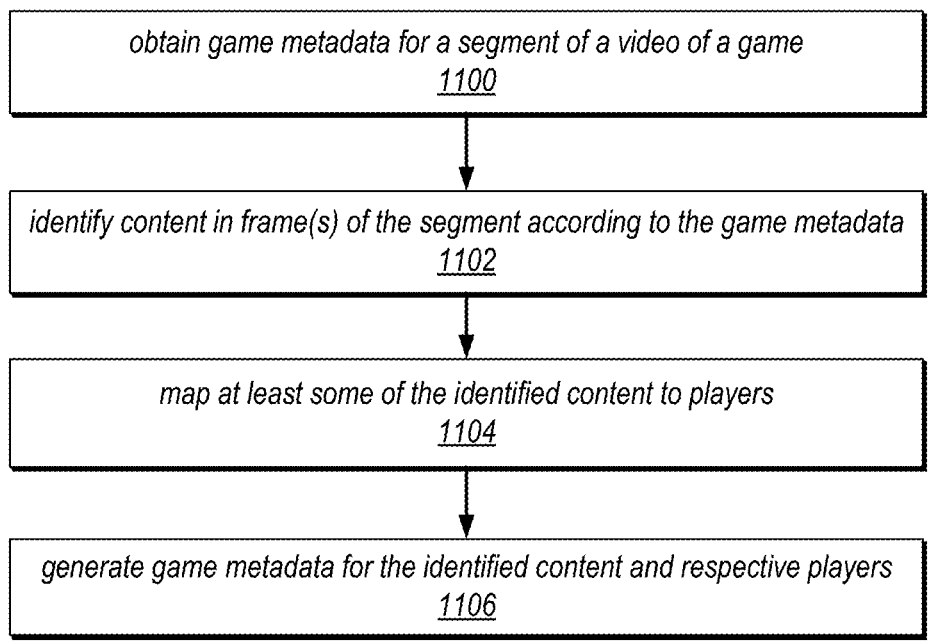
FIG. 11 is a flowchart of a method for processing game metadata to detect game content and to identify game players associated with the content, according to some embodiments.

In some embodiments, the game information system may determine content and identify players associated with the content (e.g., characters, objects, items, environmental content, etc.) in live or prerecorded game video using game metadata, and may provide information about the determined content and associated players to participant devices. FIG. 11 is a flowchart of a method for processing game metadata to detect game content and to identify game players associated with the content, according to some embodiments. The method of FIG. 11 may, for example, be applied in a game video analysis module as illustrated in FIGS. 8 and 9. In some embodiments, the method of FIG. 11 may be used in combination with the method of FIG. 10 to determine content and identify players associated with the content in game video.

As indicated at 1100, a game video analysis module of a game information system may obtain game metadata for a segment of a video of a game, for example as described in reference to FIGS. 7B and 9. As indicated at 1102, the game video analysis module may identify content in frame(s) of the segment according to the game metadata, for example as described in reference to FIGS. 7B and 9.

As indicated at 1104, the game video analysis module may map at least some of the identified content to players. For example, game metadata associated with particular content may include an identifier, name, or handle that uniquely identifies a particular player currently associated with the particular content. As another example, information about particular content (e.g., a particular game character) may be obtained that indicates one or more players that are associated with the particular content, for example players that are known to use the particular content. As another example, additional metadata may be obtained that indicates what players are participating in a particular scene of the game that is currently being analyzed, and this information may be used in mapping the content of the scene to the particular players. As another example, voice analysis of an audio track of the video may be used to identify players involved in a scene or in associating the players with particular content in the scene. As another example, video or images of the players actually playing the game may be obtained, and facial recognition techniques or other techniques may be used to identify the players; this information may be used to associate the players with the scene or in associating the players with particular content in the scene.

As indicated at 1106, the game video analysis module may generate game metadata for the identified content and respective players. For example, regions in the frames corresponding to the identified content may be used to generate overlays for the video. As another example, information about the content and/or players may be obtained from one or more game information sources according to the identified content and associated players. The obtained information for the identified content and/or players may be used to generate graphical and/or textual overlays for the video or graphical and/or textual content for user interface elements or game information windows on the participant devices.

Figure 12:
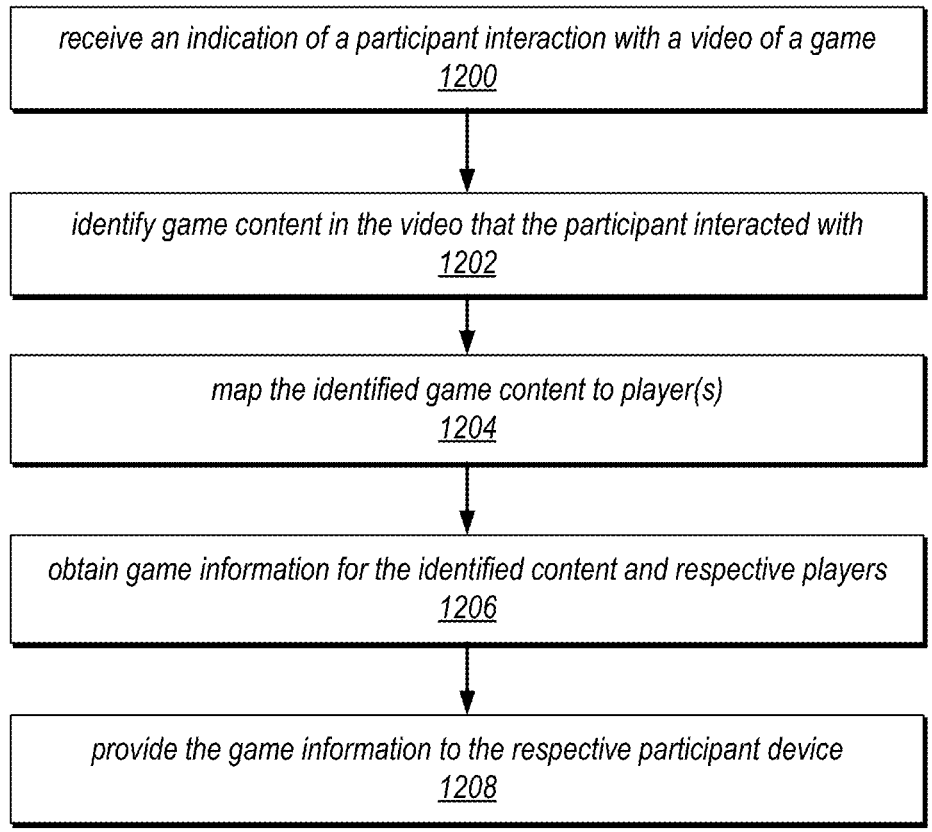
FIG. 12 is a flowchart of a method for processing participant interactions with a game to determine and provide information for game content and game players, according to some embodiments.

FIG. 12 is a flowchart of a method for processing participant interactions with a game to determine and provide information for game content and game players, according to some embodiments. The method of FIG. 12 may, for example, be implemented by a participant interaction processing module of a game information system in any of the game environments illustrated in FIGS. 1A through 4.

As indicated at 1200, a participant interaction processing module of a game information system may receive an indication of a participant interaction with a video of a game. For example, the participant may click or tap on a region of the displayed video that corresponds to a character, object, or item in the video. As indicated at 1202, the participant interaction processing module may identify game content in the video that the participant interacted with, for example as described in reference to FIGS. 7A, 7B, 8, and/or 9. As indicated at 1204, the participant interaction processing module may map the identified game content to one or more players, for example as described in reference to FIG. 10 or 11. As indicated at 1206, the participant interaction processing module may obtain game information for the identified content and respective players, for example from one or more game information sources as described in reference to FIGS. 1A through 4. The information about a particular item, object, or character may, for example, include information about a player associated with the item, object, or character, history of and statistics for the item, object, or character, powers and other attributes of the item, object, or character, and so on. The information about a particular player may, for example, include personal information (name, location, nationality, native language, age, etc.), photographs, history of and statistics for the player, games that the player has played or prefers to play, characters that the player uses or has used in the game or in other games, teams the player is on or has been on, game sessions that the player has played in, the player's strengths or weaknesses, how the player matches up to other players, previously recorded videos of the player's game play, and so on. In some embodiments, the game information may also include information on environmental content such as game boards, game levels, game maps, and so on, and tutorials, hints, or other types of reference data for the game or game play. As indicated at 1208, the participant interaction processing module may provide the game information to the respective participant device, for example as graphical and/or textual overlays for the video or graphical and/or textual content for user interface elements or game information windows on the participant devices.

In some embodiments, a participant may interact with the game information displayed on the participant device to obtain additional information. For example, the participant may interact with information about a particular item, object, or character to obtain information about a player associated with the item, object, or character, history of and statistics for the item, object, or character, powers and other attributes of the item, object, or character, how the item, object, or character compares to or matches up against other items, objects, or characters, and so on. As another example, the participant may interact with information about a player to obtain additional information about the player, for example personal information, photographs, history of and statistics for the player, games that the player has played or prefers to play, characters that the player uses or has used in the game or in other games, teams the player is on or has been on, game sessions that the player has played in, the player's strengths or weaknesses, how the player matches up to other players, previously recorded videos of the player's game play, and so on. In some embodiments, the game information may also include information on environmental content such as game boards, game levels, game maps, and so on, and the participant may interact with this information to obtain additional information such as tutorials, hints, or other types of reference data for the game or game play.

FIGS. 13A through 13E illustrate processing participant interactions with a game to determine and provide information for game content on an example participant game interface, according to some embodiment. FIGS. 13A through 13E are provided as examples, and are not intended to be limiting.

Figure 13A:
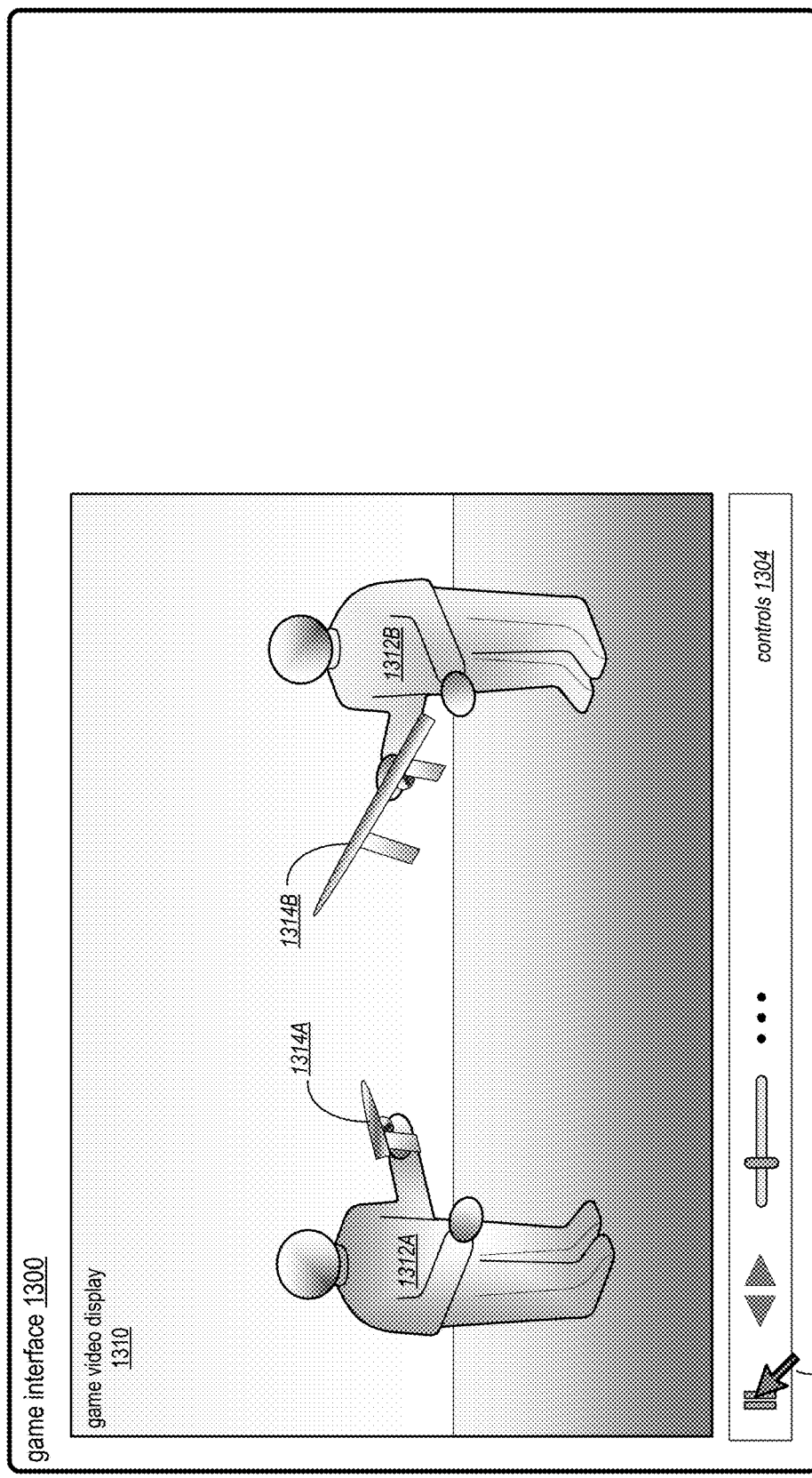
FIGS. 13A through 13E illustrate processing participant interactions with a game to determine and provide information for game content on an example participant game interface, according to some embodiments.

FIG. 13A illustrates an example simplified game display or interface 1300 that may be used on a participant device as illustrated in FIGS. 1A through 4 by spectators and/or players to view live or previously recorded video of game play. The interface 1300 may include, but is not limited to, a game video display 1310 window or pane and one or more controls 1304 for the video display 1310, for example a pause/resume control, controls to fast forward or rewind the video being played on display 1310, and an audio volume control such as a slider. A participant may interact with content of game interface 1300, for example using a cursor control device such as a mouse or keyboard, a game controller, voice commands if enabled, or touch gestures on touch- or multitouch-enabled device.

In this example, an example scene in a video of an example game is shown on display 1310. The video may be a live or previously recorded video of game play. In this scene, two characters 1312A and 1312B are shown, holding items 1314A and 1314B respectively. In this example, the items 1314 are weapons; however, any game-related item or object may be displayed. In this example, the participant pauses the video by selecting the pause/resume control. Note, however, that in some embodiments the participant may not have to pause the video to locate content in the video and obtain identities of and information about the content in the video.

Figure 13B:
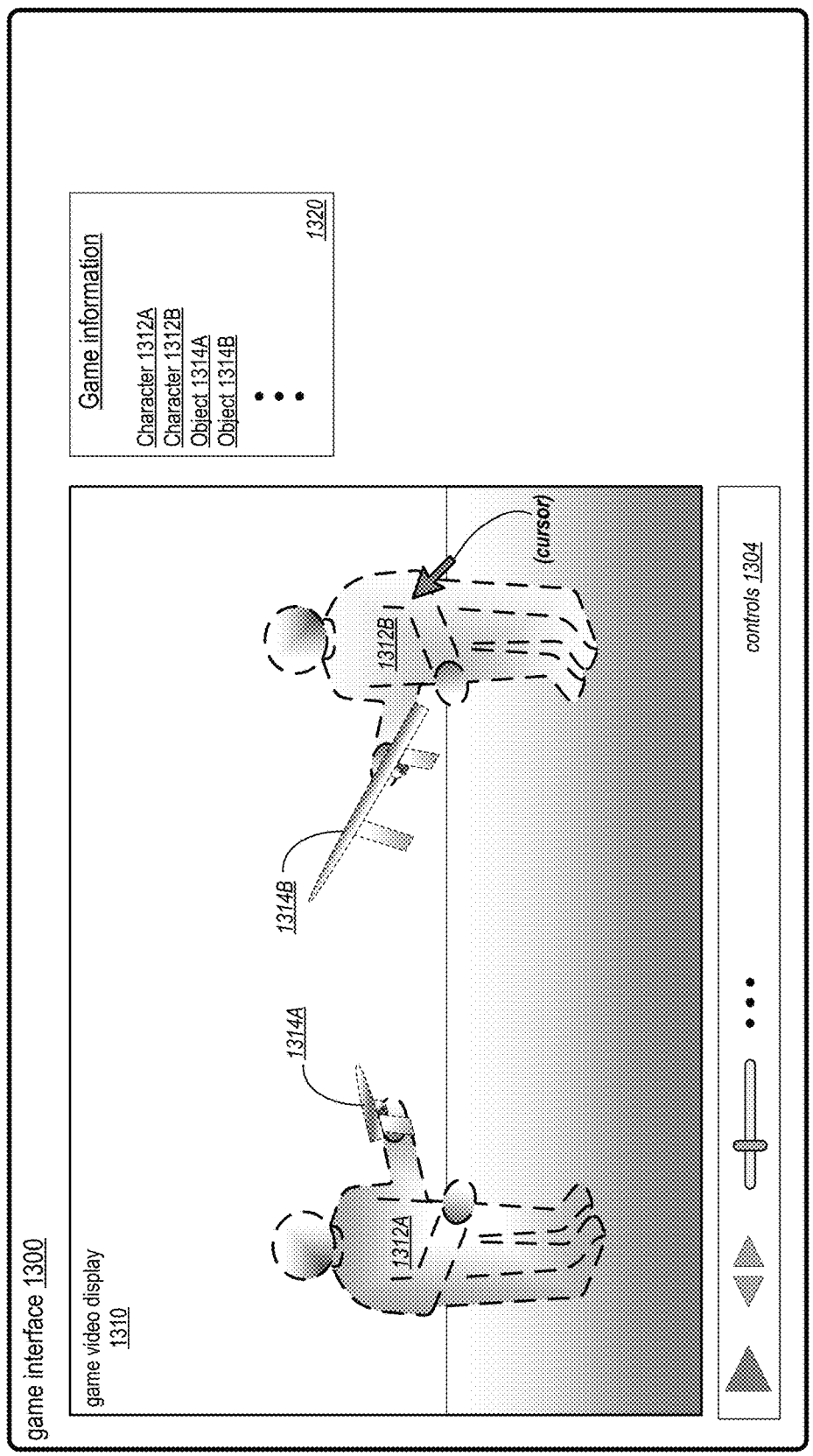

In FIG. 13B, the video is paused in display 1310. In response to the pause, the game information system may locate content in the video at or near the point where the video is paused, for example as described in reference to FIGS. 7A, 7B, 8, and/or 9. Again note that in some embodiments the participant may not have to pause the video for the game information system to locate content in the video. For example, in this example, the game information system has located characters 1312A and 1312B and items 1314A and 1314B. While not shown in FIG. 13A through 13B, in some embodiments, environmental content such as game boards, game levels, game maps, and so on may also be located or identified by analysis of the game video content. The game information system may generate overlays for the located content, as indicated by the dashed lines surrounding the located content. The overlays may, for example, be active regions that can be selected by the participant to obtain additional information about the respective content. The game information system may also obtain information about the identified content, for example as described in reference to FIGS. 7A, 7B, 8, and/or 9, and may generate content for a game information 1320 window or pane on the game interface 1300 according to the obtained information. For example, the content displayed in game information 1320 window may include names, identifiers, images, and/or descriptions of the game content that was identified in the video segment at or near the point in the video where the video is paused. In some embodiments, the content displayed in game information 1320 window may include user interface elements corresponding to the identified game content that can be selected by the participant to obtain additional information about the respective content.

Figure 13C:
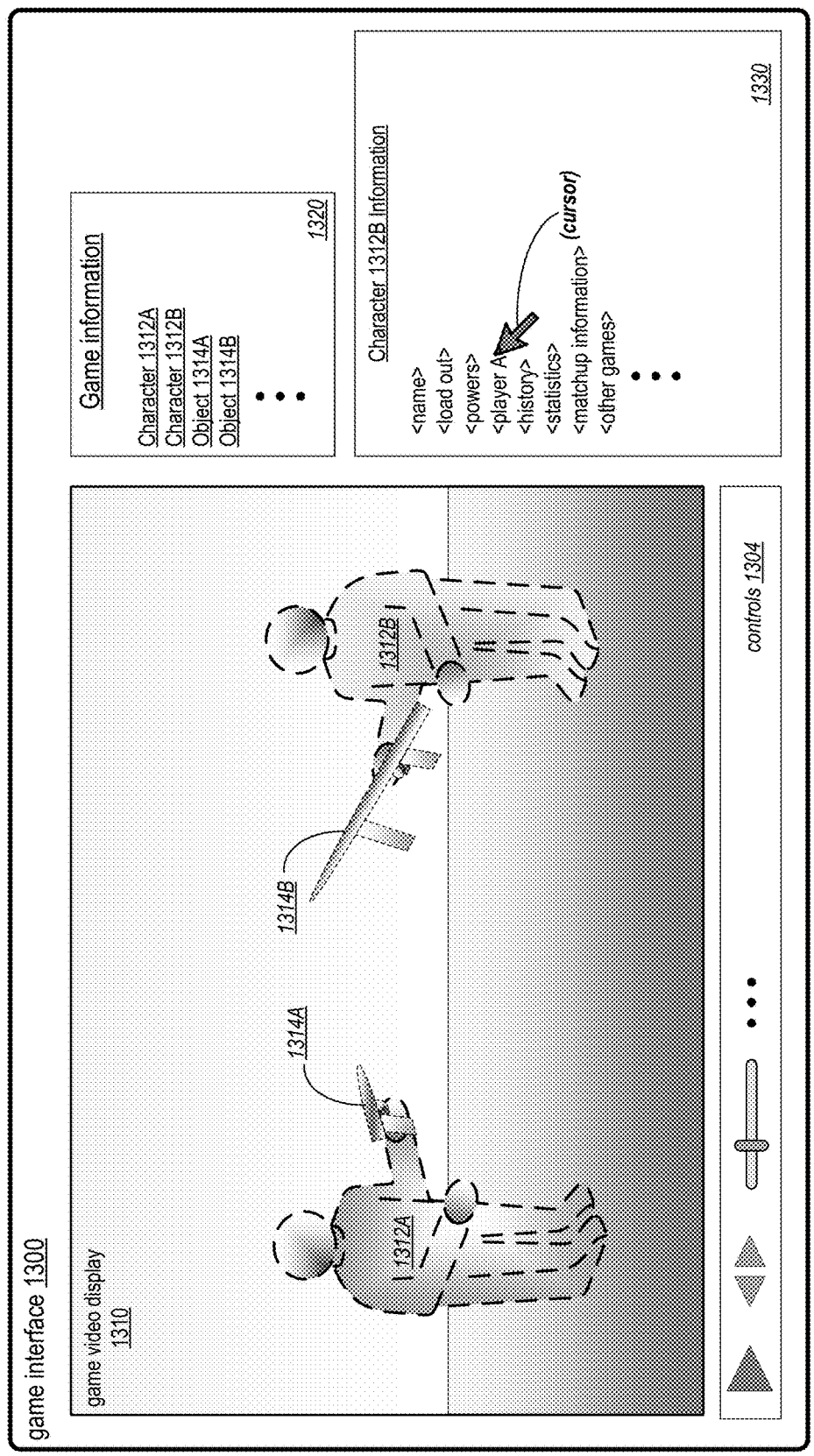

In FIG. 13B, the participant selects character 1312B in the game video display 1310. As shown in FIG. 13C, in response to the user selecting character 1312B, additional information about the character 1312B may be obtained by the game information system and displayed to a window 1330 on the game interface 1300. In this example, the information about the character 1312B may include, but is not limited to, the name of the character, the "load out" (equipment) of the character, powers of the character, a player ("player A") that is currently controlling or that is otherwise associated with the character, history of the character, statistics for the character, matchup information for the character against other characters, and other games that the character has appeared in. In some embodiments, the content displayed in window 1330 may include user interface elements corresponding to the character's various attributes that can be selected by the participant to obtain additional information about the respective attribute. For example, in this case, the participant is shown selecting "player A" to obtain information about the player associated with the character 1312B.

Figure 13D:
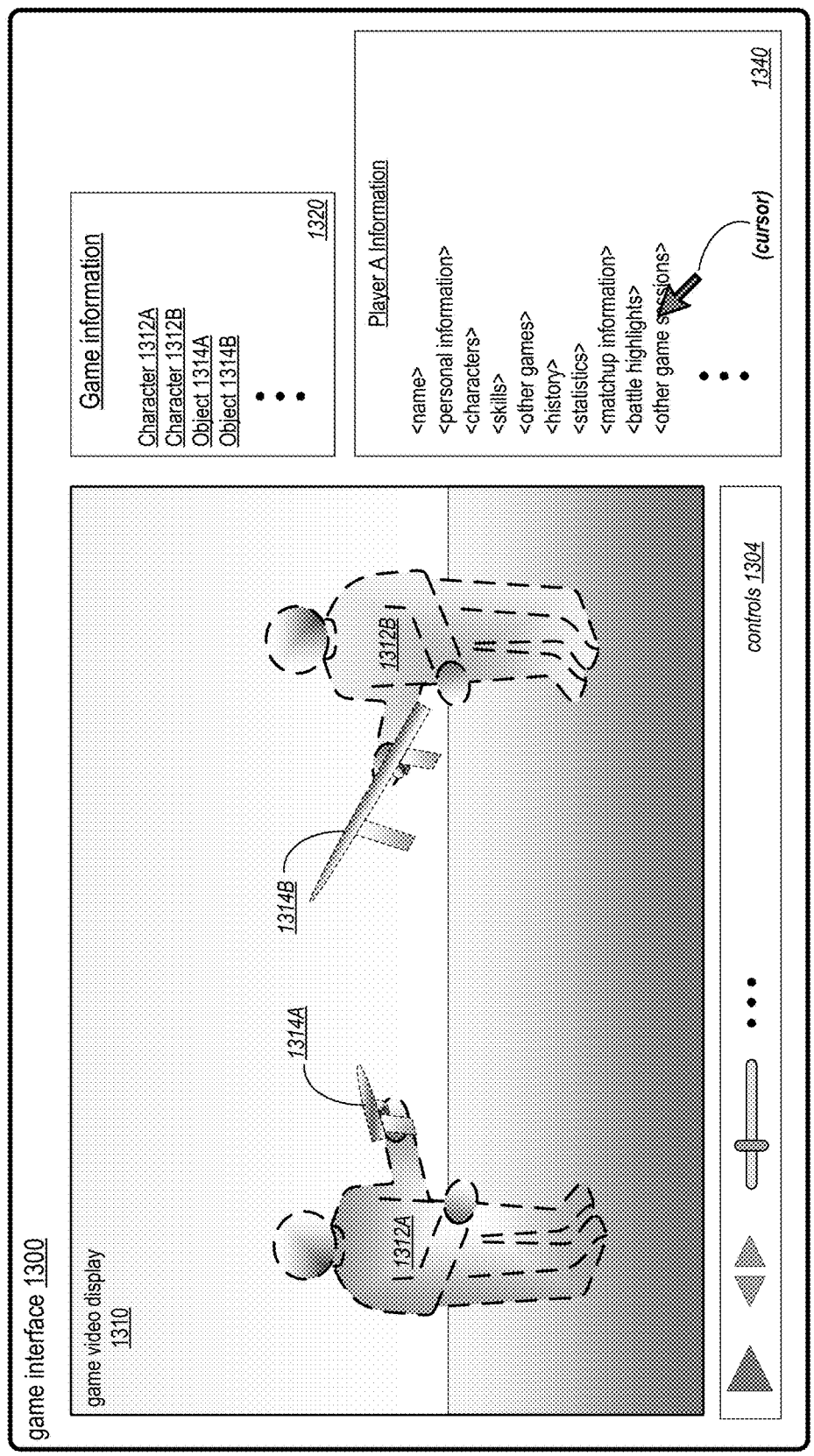

As shown in FIG. 13D, in response to the participant selecting "player A" as shown in FIG. 13C, additional information about player A may be obtained by the game information system and displayed to a window 1340 on the game interface 1300. In this example, the information about player A may include, but is not limited to, the name of the player, personal information about the player, characters that the player has used or is using, skills, strengths, or weaknesses of the player, other games that the player plays, history of the player, statistics of the player, matchup information for the player against other players, game highlights (e.g., battles) featuring the player, and other game sessions that the player has played in or is playing in. In some embodiments, the content displayed in window 1340 may include user interface elements corresponding to the player's various attributes that can be selected by the participant to obtain additional information about the respective attribute. For example, in this case, the participant is shown selecting "other game sessions" to obtain information about other game sessions that the player has played or is playing.

Figure 13E:
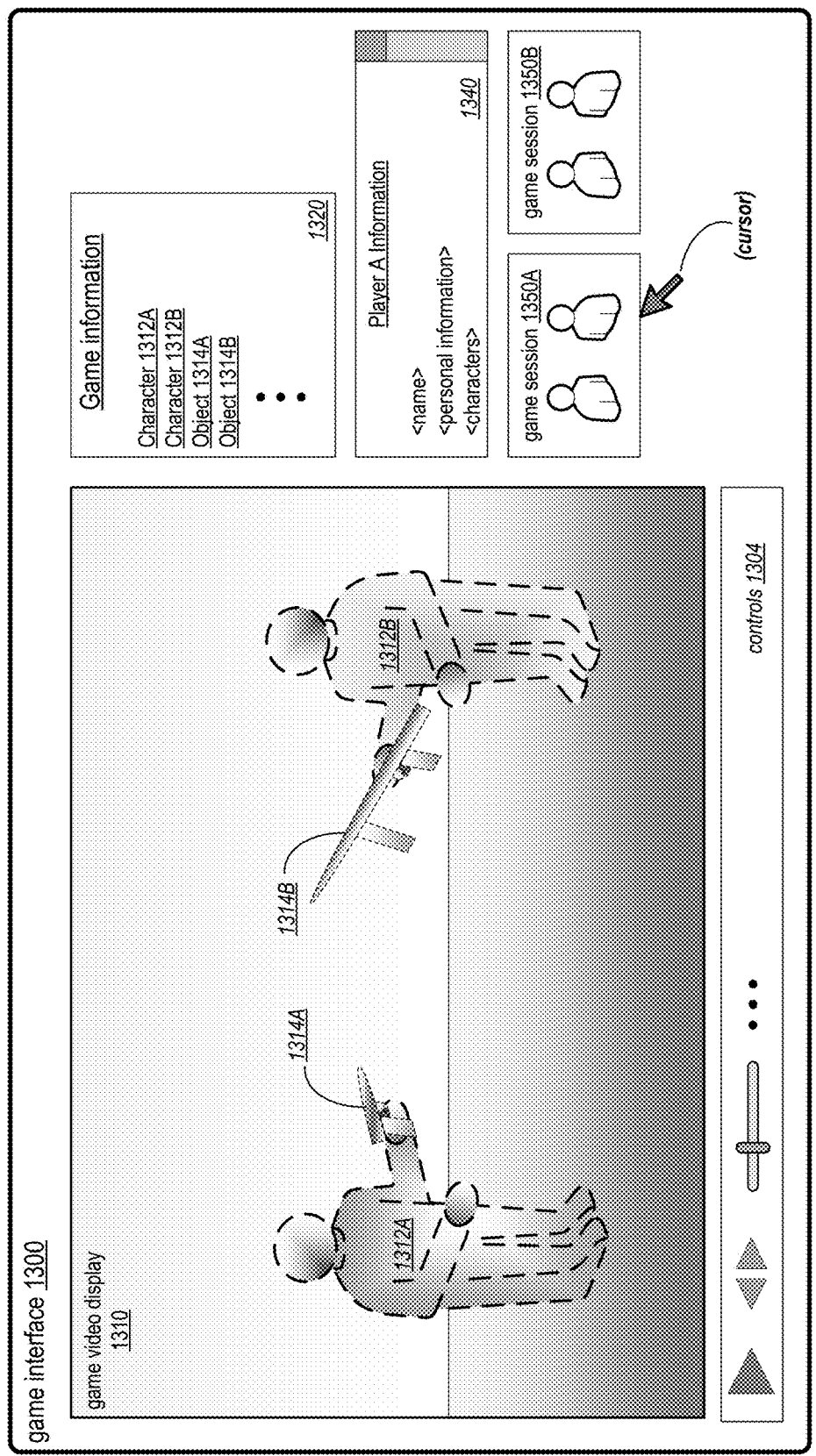

As shown in FIG. 13E, in response to the participant selecting "other game sessions" as shown in FIG. 13D, other game sessions that player A has played in or is playing in may be located by the game information system, and user interface elements 1350A and 1350B corresponding to the other game sessions may be displayed on the game interface 1300. The participant may select one of the user interface elements 1350 (for example 1350A) to view video of the respective game session 1350A. The video may be displayed in game video display 1310 or in a separate display.

While not shown in FIGS. 13A through 13E, in some embodiments, the game information that is presented to the participant via the interface 1300 may also include information on environmental content such as game boards, game levels, game maps, and so on, and the participant may interact with the presented information to obtain additional information such as tutorials, hints, or other types of reference data for the game or game play.

Enhancing Game Play

Embodiments of the methods and apparatus for providing game information to participants in game environments as described herein with reference to FIGS. 1A through 13E may enhance game play and the game experience for the participants. For example, the information about game content that is provided by the game information system may be leveraged by participants to learn about games, to enhance their game play or game viewing experience, and to provide additional information about the game that may allow a player to improve their game play or to gain a competitive advantage during game play. The following provides some examples of enhancing game play for participants using embodiments of the game information system; note that these examples are not intended to be limiting.

As an example, a spectator viewing a live or prerecorded game session may use the the game information system to obtain and view additional information about game content (characters, items, objects, players, environmental content such as game maps or levels, etc.) of a live or prerecorded game that they are viewing. Additional information such as tutorials, hints, or other types of reference data for the content, game or game play may also be obtained and viewed. For instance, when viewing a card-based game in which players play cards from their hands, a spectator may view the cards held in the different player's hands, obtain information about the cards, obtain information about the players and their game play (e.g., the particular player's history, their strategies or tendencies in general or when holding the cards in their respective hands, etc.), suggestions of plays that particular players may make, likelihood of particular players to win or lose given the distribution of the cards and histories or tendencies of the players, and so on. By obtaining and viewing this additional information, a spectator may enjoy the game spectating experience more than if the information was not made available, and may also learn more about the game and improve their own game playing skills. As another example, when viewing a board game or a map-based game, the spectator can obtain and view historical or interesting information about the particular board or map of the game that is currently being used in the game.

As another example, a player playing a game may leverage the information about game content that is provided by the game information system to improve their game play and/or to gain a competitive advantage during game play. For instance, when playing a card-based game against other players, the system may be used to provide additional information about the cards a player is holding in their hands, provide recommendations of which cards to play or moves to make on their turn or in certain situations (e.g., in response to a card played by another player), provide information (history, tendencies, skills, etc.) about the other players, and in general provide additional information about the current game scenario so that the player can learn more about and improve their skills at the game. As another example, when playing a board game or a map-based game, the player can obtain and view historical or interesting information about the particular board or map of the game that is currently being used in the game. The player may leverage this information to give them a competitive information; for example, when playing a battle-oriented game, the player may use the game information system to pull up a map of the terrain, and to get additional information that identifies or describes locations on the map, such as locations that may be (or that historically have been) used by snipers, and may use that information to avoid or attack snipers at those locations.

As another use case for the game information system, a broadcaster (see, e.g., FIG. 4) may leverage the game information system to obtain additional information about game content in a game they are broadcasting. For example, a broadcaster (who may be, but is not necessarily, a player in the game being broadcast) may use the game information system to obtain additional information about items, objects, characters, players, the game environment, game history, game strategies, and so on, and may use that additional information to enhance their broadcast content.

Example Network-Based Game Environments

FIG. 14 illustrates an example network-based game and game spectating environment, according to some embodiments. Embodiments of game systems, game spectating systems, game information systems, and other systems and services in game environments as described herein in reference to FIGS. 1 through 13 may be implemented in the context of a service provider that provides virtualized resources (e.g., virtualized computing resources, virtualized storage resources, virtualized database (DB) resources, etc.) on a provider network 4100 to clients of the service provider, for example as illustrated in FIG. 14. Virtualized resource instances may be provisioned via one or more provider network services 4192, and may be rented or leased to the clients of the service provider, for example to developer 4170 clients that develop and provide game systems 4110 or other systems or services via the provider network 4100 and services 4192.

In some embodiments, one or more developers 4170 may access one or more of services 4192 of the provider network 4100 via application programming interfaces (APIs) to the services 4192 to configure a game system 4110, game spectating service 4130, and/or game information service 4120 on the provider network 4100. A game system 4110, game spectating service 4130, or game information service 4120 may include multiple virtualized resource instances (e.g., computing resources, storage resources, DB resources, etc.).

At least some of the resource instances on the provider network 4100 (e.g., computing resources) may be implemented according to hardware virtualization technology that enables multiple operating systems to run concurrently on a host computer, i.e. as virtual machines (VMs) on the host. The provider network 4100, via the services 4192, may enable the provisioning of logically isolated sections of the provider network 4100 to particular clients as client private networks on the provider network 4100. At least some of a client's resources instances on the provider network 4100 may be provisioned in the client's private network. For example, in FIG. 14, one or more game systems 4110 may be implemented as or in private networks of respective developers 4170 that are provisioned on provider network 4100 via one or more of the services 4192. As another example, a game spectating service 4130 may be provisioned in private networks on provider network 4100 via one or more of the services 4192.

The provider network 4100, via the services 4192, may provide flexible provisioning of resource instances to clients in which virtualized resource instances can be automatically added to or removed from a configuration on the provider network 4100 in response to changes in demand or usage, thus enabling an implementation on the provider network 4100 to automatically scale to handle computation and/or storage needs. For example, one or more additional computing and/or storage resources may be automatically added to a game system 4110 and/or to game spectating service 4130 in response to an increase in game playing, broadcasting, and/or game spectating from broadcaster/player devices 4120 and/or spectator devices 4180. Conversely, if and when usage drops below a threshold, resources can be removed from a game system 4110 and/or game spectating service 4130.

In the network-based game and game spectating environment as shown in FIG. 14, participants (players, broadcaster/players, or spectators) may use participant devices 4180 to access game systems 4110 and/or spectating service 4130 on provider network 4100 via intermediate network 4150 to play games, broadcast game play, view video of games being played, or view video of previously recorded games. A game information service 4120 on provider network 4100 may provide game information functionality for the game systems 4110 and/or spectating service 4130 to provide game information to participants in game environments as described herein in reference to FIGS. 1A through 13E.

Illustrative System

In some embodiments, a computing device that implements a portion or all of the methods and apparatus for providing game information to participants in a game environment as described herein may include a general-purpose computer system that includes or is configured to access one or more computer-accessible media, such as computer system 4300 illustrated in FIG. 15. In the illustrated embodiment, computer system 4300 includes one or more processors 4310 coupled to a system memory 4320 via an input/output (I/O) interface 4330. Computer system 4300 further includes a network interface 4340 coupled to I/O interface 4330.

In various embodiments, computer system 4300 may be a uniprocessor system including one processor 4310, or a multiprocessor system including several processors 4310 (e.g., two, four, eight, or another suitable number). Processors 4310 may be any suitable processors capable of executing instructions. For example, in various embodiments, processors 4310 may be general-purpose or embedded processors implementing any of a variety of instruction set architectures (ISAs), such as the x86, PowerPC, SPARC, or MIPS ISAs, or any other suitable ISA. In multiprocessor systems, each of processors 4310 may commonly, but not necessarily, implement the same ISA.

System memory 4320 may be configured to store instructions and data accessible by processor(s) 4310. In various embodiments, system memory 4320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described herein for providing game information to participants in a game environment, are shown stored within system memory 4320 as code 4325 and data 4326.

In one embodiment, I/O interface 4330 may be configured to coordinate I/O traffic between processor 4310, system memory 4320, and any peripheral devices in the device 4300, including network interface 4340, input/output (I/O) devices, or other peripheral interfaces. In some embodiments, I/O interface 4330 may perform any necessary protocol, timing or other data transformations to convert data signals from one component (e.g., system memory 4320) into a format suitable for use by another component (e.g., processor 4310). In some embodiments, I/O interface 4330 may include support for devices attached through various types of peripheral buses, such as a variant of the Peripheral Component Interconnect (PCI) bus standard or the Universal Serial Bus (USB) standard, for example. In some embodiments, I/O interface 4330 may support one or more input/output peripheral devices or components 4370 of system 4300, such as cursor control, keyboard, display, video, and/or audio I/O devices 4370 or components, and/or input devices such as controllers or joysticks, motion tracking systems, and gesture-based input systems. In some embodiments, the function of I/O interface 4330 may be split into two or more separate components, such as a north bridge and a south bridge, for example. Also, in some embodiments some or all of the functionality of I/O interface 4330, such as an interface to system memory 4320, may be incorporated directly into at least one processor 4310.

Network interface 4340 may be configured to allow data to be exchanged between computer system 4300 and other devices 4360 attached to a network or networks 4350, such as other computer systems or devices as illustrated in FIGS. 1A through 14, for example. In various embodiments, network interface 4340 may support communication via any suitable wired or wireless general data networks, such as types of Ethernet network, for example. Additionally, network interface 4340 may support communication via telecommunications/telephony networks such as analog voice networks or digital fiber communications networks, via storage area networks such as Fibre Channel SANs, or via any other suitable type of network and/or protocol.

In some embodiments, system memory 4320 may be one embodiment of a computer-accessible medium configured to store program instructions and data as described above for FIGS. 1A through 14 for implementing embodiments of methods and apparatus for providing game information to participants in a game environment. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 4300 via I/O interface 4330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 4300 as system memory 4320 or another type of memory. Further, a computer-accessible medium may include transmission media or signals such as electrical, electromagnetic, or digital signals, conveyed via a communication medium such as a network and/or a wireless link, such as may be implemented via network interface 4340.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
 a game video source configured to provide video to a plurality of participant devices, wherein the video includes game play of one or more players in a game; and
 one or more computing devices, separate from the plurality of participant devices, configured to implement a game information module configured to:
  determine game content in the video at or near a point in the game;
  provide an indication of the game content to the separate plurality of participant devices;
  receive an interaction with an indication of particular game content displayed in the video from one of the separate plurality of participant devices;
  obtain information about the particular game content responsive to the interaction;
  provide the information about the particular game content obtained responsive to the interaction to the respective separate participant device for display;
  receive another interaction with another indication of different particular game content displayed in the video from a different one of the separate plurality of participant devices;
  obtain different information about the different particular game content responsive to the other interaction; and
  provide the different information about the different particular game content obtained responsive to the other interaction to the different separate participant device for display.

2. The system as recited in claim 1, wherein the indication of the game content includes one or more of at least one active region overlaid on the game content in the video or at least one user interface element displayed on the one or more participant devices, and wherein the information about the particular game content includes one or more of information overlaid on the video or information displayed in a separate window on the one or more participant devices.

3. The system as recited in claim 1, wherein the game content includes one or more of characters, items, objects, or environmental content in the game, and wherein, to determine game content in the video at or near a point in the game, the game information module is configured to determine the game content according to one or more of game metadata for the video at or near the point in the game, analysis of visual content of the video at or near the point in the game, or analysis of audio content of the video at or near the point in the game.

4. The system as recited in claim 3, wherein, to analyze the visual content, the game information module is configured to apply one or more machine vision techniques to one or more frames of the video at or near the point in the game to locate and identify the game content.

5. The system as recited in claim 1, wherein the game information module is further configured to:
 determine at least one player associated with the game content in the video at or near the point in the game; and
 provide an indication of the at least one player to the one or more participant devices;
 receive an interaction with an indication of a particular player from one of the one or more participant devices;
 obtain information about the particular player; and
 provide the information about the particular player to the respective participant device for display.

6. The system as recited in claim 1, wherein the game video source is a game system configured to execute the game as controlled by the one or more players via respective player devices, and wherein the video includes live video of game play or playback of previously recorded game play.

7. The system as recited in claim 1, wherein the game video source is a spectating system configured to:
 obtain the video from a game system configured to execute the game as controlled by the one or more players via respective participant devices or a store of previously recorded videos; and
 stream the video to the plurality of participant devices.

8. A method, comprising:
 performing, by a game information module implemented on one or more computing devices:
  obtaining video from a game video source, wherein the video includes game play of one or more players in a game;

determining game content in the video at or near a point in the game;

providing an indication of the game content to a plurality of separate participant devices;

receiving an interaction with an indication of particular game content displayed in the video from one of the one or more plurality of separate participant devices;

obtaining information about the particular game content responsive to the interaction; and providing the information about the particular game content obtained responsive to the interaction to the respective separate participant device for display;

receiving another interaction with another indication of different particular game content displayed in the video from a different one of the plurality of separate participant devices;

obtaining different information about the different particular game content responsive to the other interaction; and providing the different information about the different particular game content obtained responsive to the other interaction to the different separate participant device for display.

9. The method as recited in claim 8, wherein the indication of the game content includes one or more of at least one active region overlaid on the game content in the video or at least one user interface element displayed on the one or more participant devices.

10. The method as recited in claim 8, wherein the information about the particular game content includes one or more of information overlaid on the video or information displayed in a separate window on the one or more participant devices.

11. The method as recited in claim 8, wherein said determining game content in the video at or near a point in the game comprises:

obtaining game metadata for the video at or near the point in the game from the game video source; and determining the game content in the video at or near a point in the game at least in part according to the game metadata.

12. The method as recited in claim 8, wherein said determining game content in the video at or near a point in the game comprises analyzing visual content of the video at or near the point in the game to locate and identify the game content in the video at or near a point in the game.

13. The method as recited in claim 12, wherein said analyzing visual content of the video at or near the point in the game comprises applying one or more machine vision techniques to one or more frames of the video at or near the point in the game to locate and identify the game content.

14. The method as recited in claim 12, wherein said determining game content in the video at or near a point in the game further comprises analyzing audio content of the video at or near the point in the game to locate and identify the game content in the video at or near a point in the game.

15. The method as recited in claim 8, further comprising:

determining, by the game information module, at least one player associated with the game content in the video at or near the point in the game; and providing an indication of the at least one player to the one or more participant devices.

16. The method as recited in claim 15, further comprising:

receiving an interaction with an indication of a particular player from one of the one or more participant devices;

obtaining information about the particular player; and providing the information about the particular player to the respective participant device for display.

17. The method as recited in claim 8, wherein the participant devices include one or more of devices of the game players or devices of game spectators.

18. The method as recited in claim 8, wherein said determining game content in the video at or near a point in the game is performed in response to receiving an indication that the video was paused on the respective participant device.

19. The method as recited in claim 8, wherein the game content includes one or more of characters, items, objects, or environmental content in the game.

20. The method as recited in claim 8, wherein the game video source is a game system configured to execute the game as controlled by one or more players via respective participant devices, and wherein the video includes live video of game play or playback of previously recorded game play.

21. The method as recited in claim 8, wherein the game video source is a spectating system configured to obtain the video from a game system configured to execute the game as controlled by the one or more players via respective participant devices or a store of previously recorded videos and streams the video to the plurality of participant devices.

22. The method as recited in claim 8, wherein the game information module is a component of the game video source.

23. A non-transitory computer-readable storage medium storing program instructions that when executed on one or more computers cause the one or more computers to implement a game information module configured to:

receive interactions with a video from a plurality of separate participant devices, wherein the video includes game play of one or more players in a game;

determine game content in the video at or near a point in the video at which the interactions occur;

provide indications of the game content to the plurality of separate participant devices;

receive an interaction with an indication of particular game content displayed in the video from one of the plurality of separate participant devices;

obtain information about the particular game content responsive to the interaction; and provide the information about the particular game content obtained responsive to the interaction to the respective separate participant device for display;

receive another interaction with another indication of different particular game content displayed in the video from a different one of the plurality of separate participant devices;

obtain different information about the different particular game content responsive to the other interaction; and provide the different information about the different particular game content obtained responsive to the other interaction to the different separate participant device for display.

24. The non-transitory computer-readable storage medium as recited in claim 23, wherein the game content includes one or more of characters, items, objects, or environmental content in the game, and wherein, to determine game content in the video at or near a point in the game, the game information module is configured to apply one or more machine vision techniques to one or more frames of the video at or near the point in the game to locate and identify the game content.

25. The non-transitory computer-readable storage medium as recited in claim 23, wherein the game information module is further configured to:
- determine at least one player associated with the game content in the video at or near the point in the game; and
- provide an indication of the at least one player to the one or more participant devices;
- receive an interaction with an indication of a particular player from one of the one or more participant devices;
- obtain information about the particular player; and
- provide the information about the particular player to the respective participant device for display.

26. The non-transitory computer-readable storage medium as recited in claim 23, wherein the game information module is a component of a game system configured to execute the game as controlled by the one or more players via respective player devices or a component of a spectating system configured to obtain the video from a video source and stream the video to the plurality of participant device, and wherein the video includes live video of game play or playback of previously recorded game play.

* * * * *